(12) United States Patent
Miller et al.

(10) Patent No.: US 10,819,852 B2
(45) Date of Patent: Oct. 27, 2020

(54) DEVICE, SYSTEM AND METHOD FOR COMMUNICATING BETWEEN DEVICES USING TWO PROTOCOLS

(71) Applicant: MOTOROLA SOLUTIONS, INC., Chicago, IL (US)

(72) Inventors: Trent J. Miller, West Chicago, IL (US); David P. Helm, Carol Stream, IL (US); Eric Johnson, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/138,104

(22) Filed: Sep. 21, 2018

(65) Prior Publication Data

US 2020/0099789 A1 Mar. 26, 2020

(51) Int. Cl.
*H04M 3/51* (2006.01)
*H04L 29/06* (2006.01)
*H04L 29/12* (2006.01)
*H04W 76/50* (2018.01)

(52) U.S. Cl.
CPC ...... *H04M 3/5191* (2013.01); *H04L 61/2061* (2013.01); *H04L 65/1006* (2013.01); *H04L 65/1016* (2013.01); *H04L 65/1063* (2013.01); *H04L 65/1069* (2013.01); *H04L 69/08* (2013.01); *H04M 3/5116* (2013.01); *H04Q 2213/1337* (2013.01); *H04W 76/50* (2018.02)

(58) Field of Classification Search
None
See application file for complete search history.

(56) References Cited

U.S. PATENT DOCUMENTS

| 2011/0111728 | A1* | 5/2011 | Ferguson | .......... H04M 1/72541 |
| | | | | 455/404.2 |
| 2011/0225238 | A1* | 9/2011 | Shaffer | .................... H04L 63/08 |
| | | | | 709/204 |
| 2014/0096266 | A1* | 4/2014 | Hoard | ................. H04L 63/0428 |
| | | | | 726/28 |
| 2014/0126714 | A1 | 5/2014 | Sayko | |
| 2014/0219167 | A1 | 8/2014 | Santhanam | |
| 2016/0021147 | A1 | 1/2016 | Osmond | |
| 2019/0296927 | A1* | 9/2019 | Klein | .................... H04L 65/608 |

FOREIGN PATENT DOCUMENTS

WO 2016083751 A1 2/2016

* cited by examiner

*Primary Examiner* — Antim G Shah
(74) *Attorney, Agent, or Firm* — Perry + Currier, Inc.

(57) ABSTRACT

A device, system and method for communicating between devices using two protocols is provided. A request is received from a first device to communicate with a second device. A dedicated client operates according to a first protocol. A call server is operated according to a second protocol. An identifier is provided to the second device for requesting a web application for conducting a call via the call server, the identifier associated with the first and second device. A request, including the identifier is received and the web application is provided to the second device. A first call is set up between the dedicated client and a respective dedicated client. A second call is set up between the call server and the web application at the second device. The first call and the second call are connected to conduct an end-to-end call between the first and second device.

20 Claims, 14 Drawing Sheets

DEVICE, SYSTEM AND METHOD FOR COMMUNICATING BETWEEN DEVICES USING TWO PROTOCOLS

BACKGROUND OF THE INVENTION

Responders, such as police, firefighters, emergency medical technicians, and the like, often have to consult with experts and/or non-responders to understand emergency situations and the like. However, the responders may be communicating via dedicated communication applications to share voice, video, data, and the like, while the expert may not have such dedicated communication applications installed on their devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
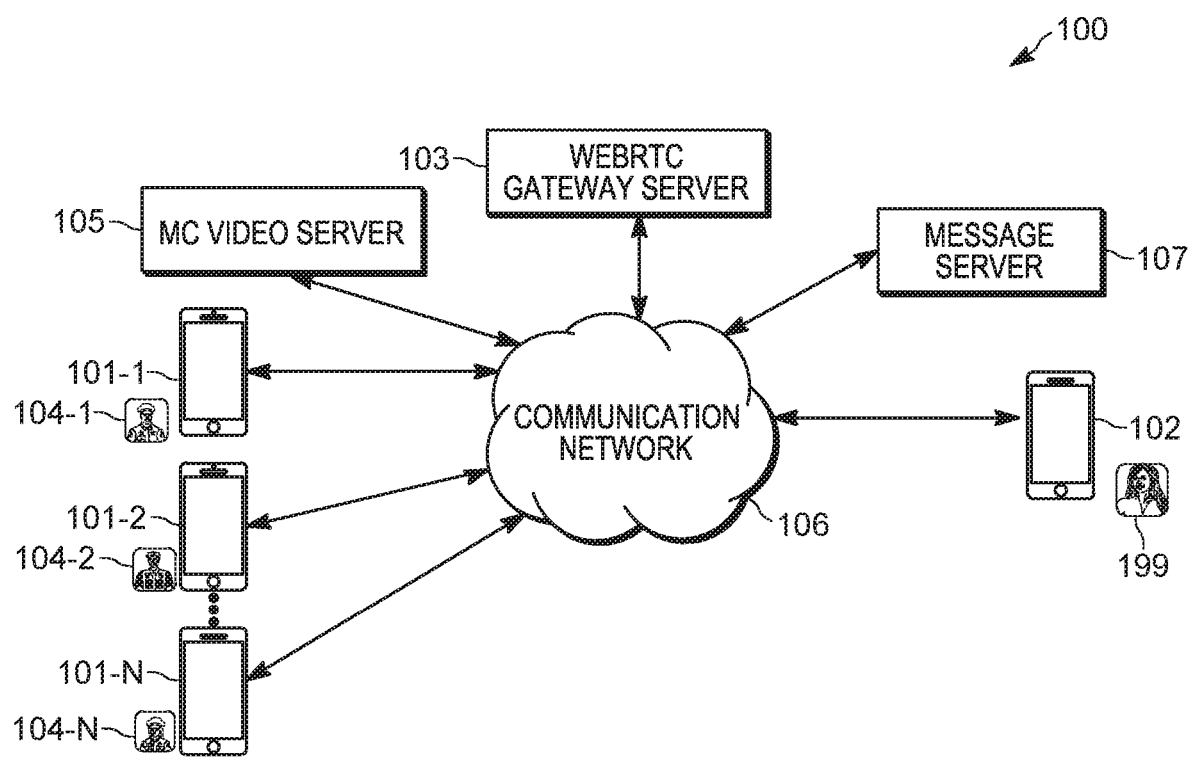
FIG. 1 depicts a system for communicating between devices using two protocols in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a server comprising: a communication unit; and a controller communicatively coupled to the communication unit, the controller configured to: receive, via the communication unit, from a first device, a first request to communicate with a second device; allocate a dedicated client operating according to a first protocol; operate a call server according to a second protocol; generate and provide, via the communication unit, to the second device, an identifier for requesting a web application for conducting a call via the call server using the second protocol, the identifier associated with the first device and the second device; receive, via the communication unit, from the second device, a second request, including the identifier, for the web application; provide, via the communication unit, to the second device, the web application; set up a first call between the dedicated client and a respective dedicated client at the first device using the first protocol; set up a second call between the call server and the web application at the second device using the second protocol; and connect the first call and the second call between the dedicated client and the call server, to conduct an end-to-end call between the first device and the second device.

Another aspect of the specification provides a method comprising: receiving, at a controller, via a communication unit, from a first device, a first request to communicate with a second device; allocating, using the controller, a dedicated client operating according to a first protocol; operating, using the controller, a call server according to a second protocol; generating, using the controller, and providing, via the communication unit, to the second device, an identifier for requesting a web application for conducting a call via the call server using the second protocol, the identifier associated with the first device and the second device; receiving, at the controller, via the communication unit, from the second device, a second request, including the identifier, for the web application; providing, using the controller, via the communication unit, to the second device, the web application; setting up, using the controller, a first call between the dedicated client and a respective dedicated client at the first device using the first protocol; setting up, using the controller, a second call between the call server and the web application at the second device using the second protocol; and connecting, using the controller, the first call and the second call between the dedicated client and the call server, to conduct an end-to-end call between the first device and the second device.

FIG. 1 illustrates a system 100 for communicating between devices using two protocols in accordance with some examples. As depicted, the system 100 comprises a plurality of first communication devices 101-1, 101-2 . . . 101-N and a second communication device 102. The first communication devices 101-1, 101-2 . . . 101-N are interchangeably referred to hereafter, collectively, as the first devices 101 and, generically, as a first device 101; the second communication device 102 is interchangeably referred to hereafter as the second device 102. The system 100 further comprises a server 103 configured to mediate communications between at least one of the first devices 101 and the second device 102 using a first protocol to communicate with the first devices 101 and a second protocol to communicate with the second device 102.

Each of the first devices 101 may comprise a portable and/or mobile communication device, and the like, for example operated by a respective responder 104-1, 104-2 . . . 104-N (interchangeably referred to hereafter, collectively, as the responders 104 and, generically, as a responder 104) and/or a respective user including, but not limited to, public safety personnel, dispatchers, police, firefighters, emergency medical technicians, and the like. However, one or more of the first devices 101 may alternatively comprise a non-mobile device, personal computer, a laptop device, and a dispatch computing device and/or dispatch terminal, and the like. While three of a number "N" of first devices 101 are depicted, the system 100 may comprise as few as one first device 101 or tens, hundreds, thousands etc. of first devices 101. Furthermore, while present examples are described with respect to the users of the first devices 101 being the responders 104, in other examples the users of the first devices 101 may not be responders and may be members and/or employees of businesses and/or other non-public safety organizations, and or other types of user, and the like.

The second device 102 may comprise a portable and/or mobile communication device (e.g. as depicted), and the like and/or a non-mobile device operated, for example, by an expert 199 and/or user. For example one or more of the responders 104 may be participating in a public safety incident and may want to consult with the expert 199 about the public safety incident. For example, a responder 104 may wish to one or more of: call a doctor for medical device; call an electric company worker to say a tree limb is on a power line; call a city worker to talk about a pothole; call a city worker about a water main leak; call a witness for incident data; and the like. Hence, the expert 199 may be a doctor, an electric company worker, an electric company worker, a city worker, a witness and/or any other type of user and/or "expert".

However, the responders 104 may be communicating via respective dedicated clients operating at each of the first devices 101 according to a first protocol. Furthermore such communications between the first devices 101 may comprise video calls and/or one-to-one video calls and/or group video calls (and/or any call where two or more of the devices 101 may share an identifier) that may occur via a first protocol server 105, operating according to the first protocol, and at least one communication network 106 (interchangeably referred to hereafter as the network 106). As depicted, the first protocol server 105 comprises a Mission Critical (MC) Video server, and is interchangeably referred to hereafter as the MC Video server 105. However the first protocol server 105 may comprise any suitable server configured to mediate calls and/or group calls between the first devices 101 via dedicated clients at the first devices 101, including, but not limited to, a Mission Critical Push-to-Talk (MCPTT) server and/or any other type of MC and/or "MCX" server, and the like. Hence, as described herein such communications between the first devices 101 via the first protocol server 105 (and the network 106) may comprise audio calls, video calls and/or group audio and/or group video calls operating according to an MC protocol that may occur via a 3rd Generation Partnership Project (3GPP) protocol (e.g. MC protocols have generally been standardized under 3GPP). Similarly, the first protocol used by the first devices 101 and the first protocol server 105 may comprise one or more of a Mission Critical (MC) protocol and a 3rd Generation Partnership Project (3GPP) protocol. For example, MC protocols are generally protocols used by public safety organizations and such public safety organization may deploy the first devices 101, to the responders 104, with dedicated MC Video clients, and the like, already installed at the first devices 101. Hence, each of the first devices 101 and/or the responders 104 may have accounts with a provider (e.g. a public safety organization and/or a business providing services to public safety organizations) operating the first protocol server 105.

In some examples, however, the first protocol used by the first devices 101 and the first protocol server 105 may comprise one or more of a non-MC protocol, a Voice over Internet Protocol (VoIP) group protocol, a party-line protocol, an Internet Protocol (IP) Multimedia Subsystem (IMS) protocol and/or one or more video sharing protocols (including, but not limited Real-Time Messaging Protocol (RTMP), Real Time Streaming Protocol (RTSP), Hypertext Transfer Protocol (HTTP) Live Streaming (HLS), Dynamic Adaptive Streaming over HTTP (DASH), and the like).

The second device 102 may comprise a commercial device operated by the expert 199, who is not part the of the same public safety organization as the responders 104, and hence the second device 102 does not have the dedicated client installed thereupon and/or the second device 102 is not operating according to the first protocol used by the first devices 101 and/or the second device 102 and/or the expert 199 generally does not have an account with the first protocol server 105. While a responder 104 may generally use a first device 101 to call the second device 102 via a phone call and/or commercially available application (e.g. rather than using a dedicated MC Video client and the like), such phone calls and/or commercially available applications generally reveal the phone number, etc. of the first device 101 to the second device 102 and/or the expert 199; Furthermore, phone calls are generally limited to voice (e.g. no exchange of video, files, and the like) and cannot be shared with other responders 104, for example in a group call.

Hence, as depicted herein, the first devices 101 are further configured to communicate with the server 103 via the MC video server 105, the server 103 being generally configured to mediate communications between at least one of the first devices 101 and the second device 102 using the first protocol, as described above, and a second protocol that operates using a call server and web applications, as described hereafter.

For example, the second device 102 is generally configured to operate according to the second protocol, which may include a Web Real-Time Communication (WebRTC) protocol, and/or any other suitable protocol that operates using a call server and web applications. In particular, WebRTC technology (standardized via the World Wide Web Consortium) provides audio, video, and data application programming interfaces (APIs) for real-time communications via browsers and/or browser applications, and the like, for example via web applications that may be retrieved via webpages, and the like, and processed via browsers, and/or via stand-alone web applications which may be processed without use of a browser.

Hence, the server 103 generally sets up: a first call between dedicated clients at one or more of the first devices 101 and a temporary dedicated client (e.g. an MC Video client) allocated at the server 103, for example via the MC video server 105; and a second call between a call server at the server 103 and a web application at the second device 102. The first call may be set up before, during or after set up of the second call. The call server at the server 103 generally operates according to the second protocol such as the WebRTC protocol. The server 103 connects the first call and the second call to conduct an end-to-end call between one or more of the first devices 101 and the second device 102. In particular, the server 103 generates, and provides to the second device 102, an identifier for requesting a web application for conducting the second call via the call server using the second protocol, the identifier associated with the first device 101 and the second device 102 at the server 103, and used to connect the first call and the second call, as described hereafter. For example, as depicted, the system 100 further comprises a message server 107 which may be used by the server 103 to transmit the identifier to the second device 102, as also described hereafter, and the second device 102 may request the web application using the identifier.

Hence, the network 106 generally comprises one or more networks suitable for communicating with the first devices 101, via the first protocol, and the second device 102, via the second protocol. As such, the network 106 may comprise any suitable combination of cell phone networks, digital mobile radio (DMR) networks, a Project 25 (P25) network, a terrestrial trunked radio (TETRA) network, the Internet, 3GPP compatible networks, MCX compatible networks, WebRTC compatible networks, WiFi networks (for example operating in accordance with an IEEE 802.11 standard (e.g., 802.11a, 802.11b, 802.11g)), Worldwide Interoperability for Microwave Access (WiMAX) networks (for example operating in accordance with an IEEE 802.16 standard) and the like; however, the network 106 may comprise wired IP networks including, but not limited to, the Internet, an Ethernet, and the like.

Figure 2:
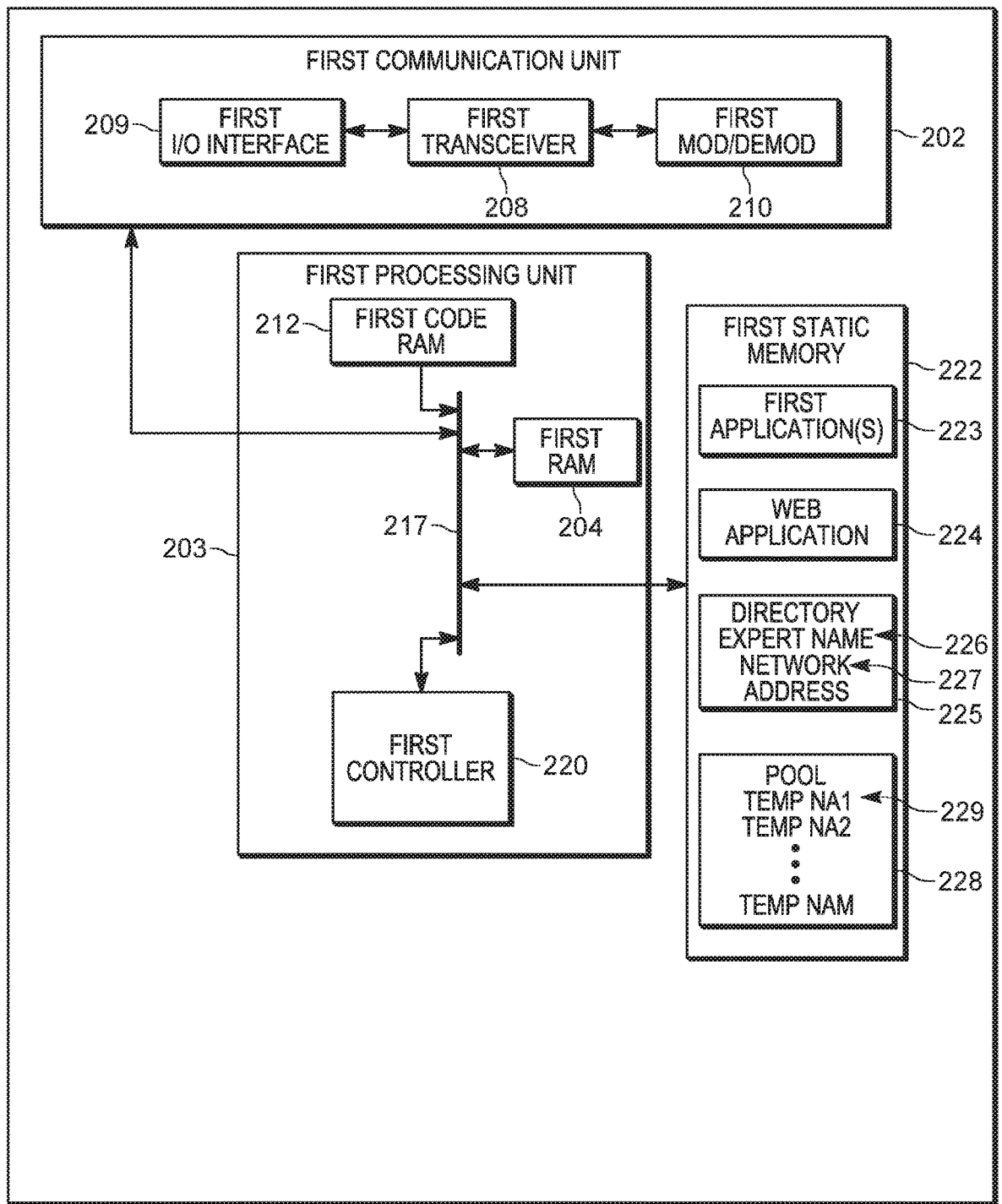
FIG. 2 depicts a server for communicating between devices using two protocols in accordance with some examples.

Attention is next directed to FIG. 2 which sets forth a schematic diagram of the example server 103. While the system 100 depicts only one server 103, the system 100 may comprise a plurality of servers, and the functionality of the server 103 may be distributed among such a plurality of servers, and the like.

As depicted in FIG. 2, the example server 103 generally includes a first communications unit 202, a first processing unit 203, a first Random-Access Memory (RAM) 204, one or more first wireless transceivers 208, one or more first wired and/or wireless input/output (I/O) interfaces 209, a first combined modulator/demodulator 210, a first code Read Only Memory (ROM) 212, a first common data and first address bus 217, a first controller 220, and a first static memory 222 storing at least one first application 223, a web application 224, a directory 225 of experts (including, but not limited to a name 226 of the expert 199 and a network address of the second device 102), and a pool 228 of temporary network addresses 229. Hereafter, the at least one application 223 will be interchangeably referred to as the application 223. Furthermore, each of the memories 212, 222 comprise non-transitory memories and/or non-transitory computer readable mediums. In some examples, the web application 224 and/or the directory 225 may be stored at memory external to the server 103; regardless, the web application 224 and/or the directory 225 are stored at a memory accessible to the controller 220.

The server 103 is described hereafter in further detail.

As shown in FIG. 2, the server 103 includes the communications unit 202 coupled to the common data and address bus 217 of the processing unit 203. While not depicted, the server 103 may also include one or more input devices (e.g., keypad, pointing device, touch-sensitive surface, etc.) and a display screen (which, in some embodiments, may be a touch screen and thus also act as an input device), each coupled to be in communication with the processing unit 203. The server 103 may also include one or more of speaker and a microphone used for interactions with the server 103.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and a static memory 222.

The communications unit 202 may include one or more wired and/or wireless input/output (I/O) interfaces 209 that are configurable to communicate with other communication devices.

For example, the communication unit 202 may include one or more transceivers 208 and/or wireless transceivers for communicating with the first devices 101, the first protocol server 105 and the second devices 102. The one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communications unit 202 may optionally include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components (e.g. a display screen, an input device, a speaker and/or a microphone, and the like).

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the server 103 is not a generic controller and/or a generic device, but a device specifically configured to implement functionality for communicating between devices using two protocols. For example, in some examples, the server 103 and/or the controller 220 specifically comprises a computer executable engine configured to implement functionality for communicating between devices using two protocols.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the server 103 as described herein are maintained, persistently, at the memory 222 and used by the controller 220 which makes appropriate utilization of volatile storage during the execution of such programming instructions.

In particular, the memory 222 stores instructions corresponding to the at least one application 223 that, when executed by the controller 220, enables the controller 220 to implement functionality for communicating between devices using two protocols. In illustrated examples, when the controller 220 executes the one or more applications 223, the controller 220 is enabled to: receive, via the communication unit 202, from a first device 101, a first request to communicate with the second device 102; allocate a dedicated client operating according to a first protocol; operate a call server according to a second protocol; generate and provide, via the communication unit 202, to the second device 102, an identifier for requesting the web application 224 for conducting a call via the call server using the second protocol, the identifier associated with the first device 101 and the second device 102; receive, via the communication unit 202, from the second device 102, a second request, including the identifier, for the web application 224; provide, via the communication unit 202, to the second device 102, the web application 224; set up a first call between the dedicated client and a respective dedicated client at the first device 101 using the first protocol; set up a second call between the call server and the web application 224 at the second device 102 using the second protocol; and connect the first call and the second call between the dedicated client and the call server, to conduct an end-to-end call between the first device 101 and the second device 102.

The web application 224 may comprise a webpage and/or a web application embeddable in a webpage, that may be processed via browsers and/or browser applications, and the like. Alternatively, the web application 224 may comprise a stand-alone web applications which may be processed without use of a browser.

While, as depicted, the memory 222 stores the directory 225 that includes a single entry that includes the name 226 of the expert 199 and a network address 227 of the second device 102, the directory 225 may store any number of entries, each corresponding to expert names and associated network addresses of associated second devices. Furthermore, the network address 227 may comprise an email address, a telephone number, a text message phone number, an instant messenger address, an Open Authorization (OAuth) identity, a social media identity, and the like associated with the second device 102. Furthermore, each entry in the directory 225 may include, but is not limited to: a name of an expert; the organization of the expert; expertise of the expert; a role and/or title of the expert; one or more preferred contact methods (e.g. email vs text message); a network address of the expert; optional authentication information (e.g. such as login data, a password, facial data, voice data); work hours of the expert; and the like. Indeed, experts, such as the expert 199, may have registered with the public safety organization, and the like, of the responders 104, and the entries in the directory 225 may be generated upon such registration. Indeed, a person of skill in the art understands that the directory 225 may comprise a preconfigured list of users and/or experts, with their associated expertise, mobile phone number, email, and other information, and that the directory 225 may be implemented as one or more of a phone address book, a website, a database and the like. Furthermore, the public safety organization, and the like, may have generally communicated with the experts prior to the responders 104 contacting them so that the experts register with the public safety organization, and the like, and understand that they might be contacted for consultations in public safety incidents.

However, while present examples are described with respect to the first devices 101 and/or the responders 104 contacting the second device 102 and/or the expert 199 via the directory 225, in other examples the Optionally, the first devices 101 and/or the responders 104 may initiate a request to communicate with the second device 102 and/or the expert 199 by manually entering contact info (email, text, IM address, etc.) into, for example, an API, and/the like.

As depicted, the memory 222 further stores the pool 228 of a number "M" o of the temporary network addresses 229. In general, one temporary network address 229 may be temporarily used in setting up the first call between the server 103 and one or more of the first devices 101, in the end-to-end call between the one or more of the first devices 101 and the second device 102. For example, the temporary network addresses 229 are generically depicted as "Temporary NA1 (e.g. Network Address 1)", "Temporary NA2 (e.g. Network Address 2)" . . . "Temporary NAM (e.g. Network Address M)". However, a person of skill in the art may understand that email addresses of the first devices 101 (and/or the responders 104) may be used as 3GPP MC Service identifiers in MC calls and/or group calls, and hence each of the temporary network addresses 229 may comprise a respective temporary 3GPP MC Service identifier, including, but not limited to, respective email addresses that may be temporarily assigned to the second device 102 for used in the first call (e.g. when the first protocol of the first call comprises one or more of an MC protocol and a 3GPP protocol).

However, such an assignment generally occurs at the server 103 and the second device 102 is generally not provided with the temporary 3GPP MC Service identifier. While a temporary network address 229 is in use during the first call, the temporary network address 229 is generally frozen at the pool 228 (e.g. not available for other first calls with other second devices), and unfrozen after one or more of: the end-to-end call (and/or the first call) ends; and a given time period.

However, in other examples, the server 103 may use an email address associated with the second device 102 and/or the expert 199 as the temporary 3GPP MC Service identifier, for example an email address of the second device 102 and/or the expert 199 stored at the directory 225.

Figure 3:
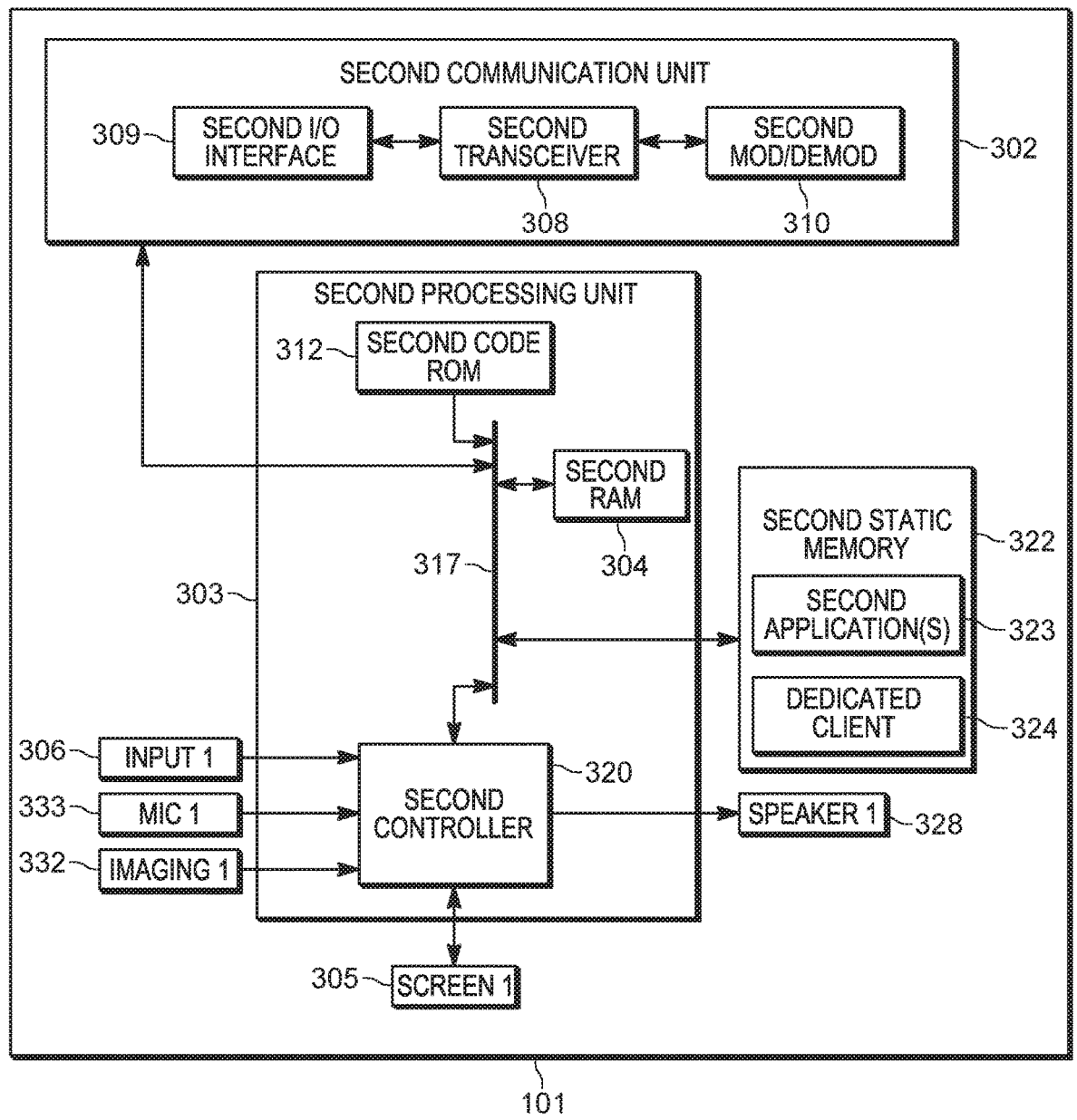
FIG. 3 depicts a first device for communicating using two protocols via the server of FIG. 2 in accordance with some examples.

Attention is next directed to FIG. 3 which sets forth a schematic diagram that illustrates an example first device 101. While the example first device 101 of FIG. 3 is described with respect to a wireless device, the example first device 101 may alternatively comprise a wired device with components adapted accordingly (e.g. the example first device 101 may include Ethernet communication components). As depicted in FIG. 3, the example first device 101 generally includes a second communications unit 302, a second processing unit 303, a second Random-Access Memory (RAM) 304, a display screen 305 (labelled "Screen 1"), an input device 306 (labelled "Input 1"), one or more second wireless transceivers 308, one or more second wired and/or wireless input/output (I/O) interfaces 309, a second combined modulator/demodulator 310, a second code Read Only Memory (ROM) 312, a second common data and address bus 317, a second controller 320, a second static memory 322 storing at least one second application 323 (interchangeably referred to hereafter as the application 323) and a dedicated client 324, a speaker 328 (labelled "Speaker 1"), an imaging device 332 (labelled "Imaging 1") and a microphone 333 (labelled "MIC 1"). Furthermore, each of the memories 312, 322 comprise non-transitory memories and/or non-transitory computer readable mediums.

However, while the example first device 101 is described with respect to including certain components, it is understood that the example first device 101 may be configured according to the functionality of a specific device. For example, one or more of the imaging device 332, the microphone 333 and/or other media components associated with the example first device 101 may be external to the example first device 101 and communicatively coupled thereto.

As another example, the example first device 101 may further include a location determination device (for example, a global positioning system (GPS) receiver) and the like. Other combinations are possible as well.

The example first device 101 is described hereafter in further detail. In general, the example first device 101 is configured to participate in a group call according to a first protocol (e.g. an MC protocol and/or a 3GPP protocol) by exchanging audio, video, and/or data with one or more other first devices 101.

As shown in FIG. 3, the example first device 101 includes the communications unit 302 coupled to the common data and address bus 317 of the processing unit 303. The example first device 101 may also include one or more input devices 306 (e.g., keypad, pointing device, touch-sensitive surface, etc.) and the display screen 305 (which, in some examples, may be a touch screen and thus also act as an input device 306), each coupled to be in communication with the processing unit 303.

The speaker 328 may be present for reproducing audio that is decoded from voice or audio streams of calls received via the communications unit 302 from other communication devices 101, for example in a group call. The microphone 333 may be present for capturing audio from a user (not depicted) that is further processed by the processing unit 303 and/or is transmitted as voice or audio data by the communications unit 302 to other communication devices 101, for example in a group call. Hence, the combination of the speaker 328 and the microphone 333 may enable the example first device 101 to communicate in group calls via audio and/or voice communications, channels and/or talkgroups, and the like. The display screen 305 may comprise any suitable display screen including, but not limited to, a flat panel display screen, and the like, and which may be used to provide video in a group call. The imaging device 332 may provide video (still or moving images) of an area in a field of view of the example first device 101 for further processing by the processing unit 303 and/or for further transmission by the communications unit 302 and which may also be used in communications in a group call. Hence, the combination of the display screen 305 and the imaging device 332 (along with the combination of the speaker 328 and the microphone 333) may enable the example first device 101 to communicate in group calls via video communications, channels and/or talkgroups, and the like.

The processing unit 303 may include the code Read Only Memory (ROM) 312 coupled to the common data and address bus 317 for storing data for initializing system components. The processing unit 303 may further include the controller 320 coupled, by the common data and address bus 317, to the Random-Access Memory (RAM) 304 and a static memory 322.

The communications unit 302 may include one or more wired and/or wireless input/output (I/O) interfaces 309 that are configurable to communicate with the other communication devices 101 in a group call.

For example, the communication unit 302 may include one or more transceivers 308 and/or wireless transceivers for communicating with others of the first devices 101 (and/or the first protocol server 105), and the server 103. The one or more transceivers 308 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310. However, as described herein, the communication devices 101 are configured to communicate wirelessly.

The controller 320 may include ports (e.g. hardware ports) for coupling to the display screen 305, the input device 306, the imaging device 332, the speaker 328 and/or the microphone 333.

The controller 320 includes one or more logic circuits, one or more processors, one or more microprocessors, one or more ASIC (application-specific integrated circuits) and one or more FPGA (field-programmable gate arrays), and/or another electronic device. In some examples, the controller 320 and/or the example first device 101 is not a generic controller and/or a generic device, but a device specifically configured to implement functionality for conducting end-to-end calls with the second device 102, including, but not limited to, group calls with other first devices 101, via the server 103. For example, in some examples, the example first device 101 and/or the controller 320 specifically comprises a computer executable engine configured to implement functionality for conducting end-to-end calls with the second device 102, including, but not limited to, group calls with other first devices 101, via the server 103.

The static memory 322 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 3, programming instructions (e.g., machine readable instructions) that implement the functional teachings of the example first device 101 as described herein are maintained, persistently, at the memory 322 and used by the controller 320 which makes appropriate utilization of volatile storage during the execution of such programming instructions.

In particular, the memory 322 stores instructions corresponding to the application 323 that, when executed by the controller 320, enables the controller 320 to implement functionality for conducting end-to-end calls with the second device 102, including, but not limited to, group calls with other first devices 101, via the server 103. In illustrated examples, when the controller 320 executes the application 323, the controller 320 is enabled to: communicate, via the communication until 302, with the server 103, to select the expert 199 from the directory 225 to activate an end-to-end call with the second device 102; and establish a first call, of the end-to-end call, between the dedicated client 324 and a temporary dedicated client at the server 103, via the first protocol server 105. The first call may comprise a group call with others of the first devices 101 and/or the first call may comprise a video call.

The dedicated client 324 is generally compatible with the first protocol and may be used in group calls with the other first devices 101. Hence, the dedicated client 324 may comprise an MC Video client and/or other type of MC client.

Figure 4:
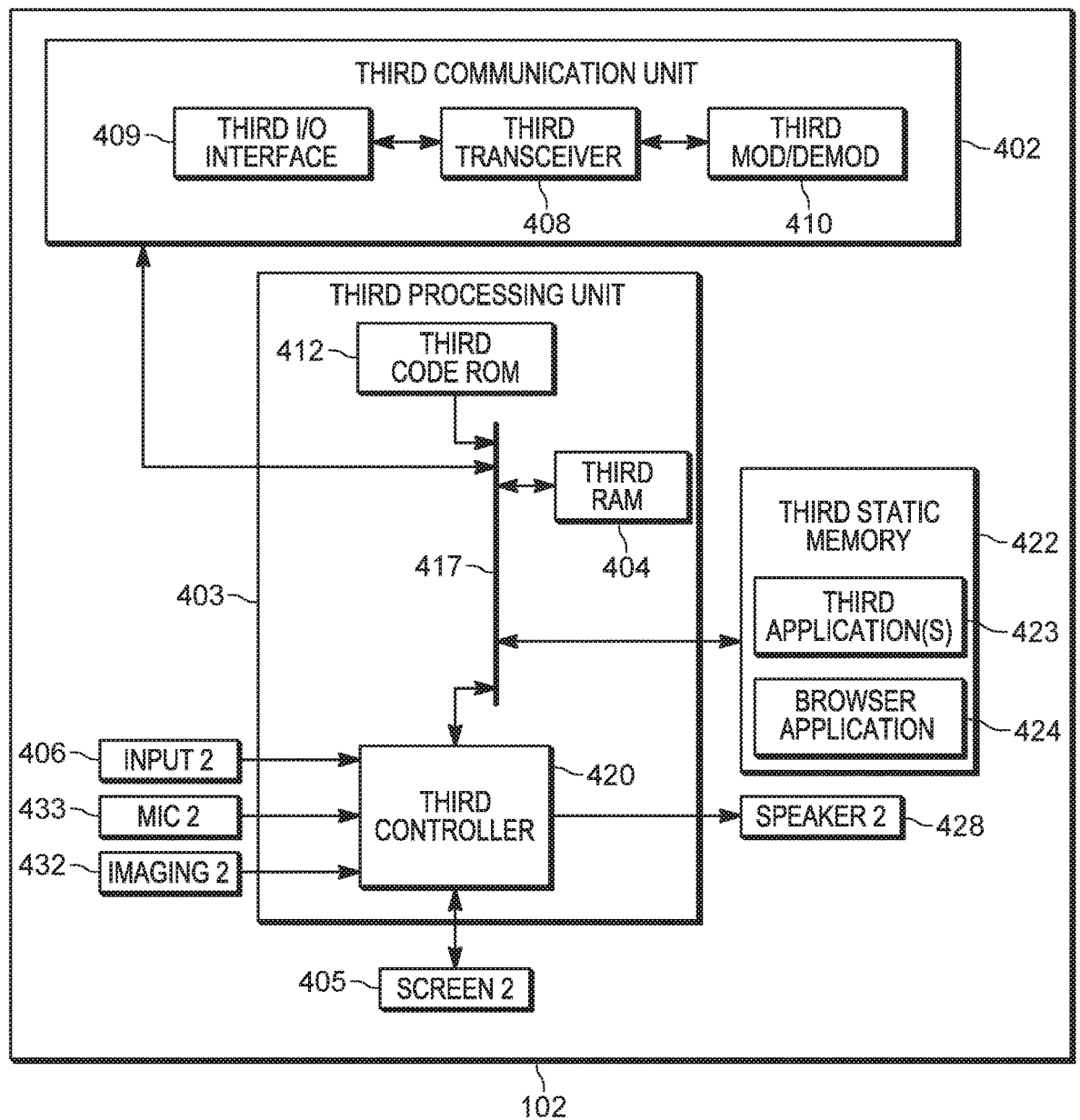
FIG. 4 depicts a second device for communicating using two protocols via the server of FIG. 2 in accordance with some examples.

Attention is next directed to FIG. 4 which sets forth a schematic diagram that illustrates an example second device 102. While the example second device 102 of FIG. 2 is described with respect to a wireless device, the example second device 102 may alternatively comprise a wired device with components adapted accordingly (e.g. the example second device 102 may include Ethernet communication components). As depicted in FIG. 4, the example second device 102 generally includes a third communications unit 402, a third processing unit 403, a third Random-Access Memory (RAM) 404, a display screen 405 (labelled "Screen 2"), an input device 406 (labelled "Input 2"), one or more third wireless transceivers 408, one or more third wired and/or wireless input/output (I/O) interfaces 409, a third combined modulator/demodulator 410, a third code Read Only Memory (ROM) 412, a third common data and address bus 417, a third controller 420, a third static memory 422 storing at least one third application 423 (interchangeably referred to hereafter as the application 423) and an optional browser application 424, a speaker 428 (labelled "Speaker 2"), an imaging device 432 (labelled "Imaging 2") and a microphone 433 (labelled "MIC 2"). Furthermore, each of the memories 412, 422 comprise non-transitory memories and/or non-transitory computer readable mediums. Each of the components of the example second device 102 is generally similar to the corresponding components of the first example device 101 except as otherwise described.

For example, the communication unit 402 may include one or more transceivers 408 and/or wireless transceivers for communicating with the server 103 and the messaging server 107. The one or more transceivers 408 may include, but are not limited to, a cell phone transceiver, a Bluetooth transceiver, a Wi-Fi transceiver, a WiMAX transceiver, and/or another similar type of wireless transceiver configurable to communicate via a wireless radio network. However, in contrast to the example first device 101, the one or more transceivers 408 may not include a DMR transceiver, P25 transceiver, a TETRA transceiver, which can be specifically for use with devices associated with public safety organizations.

Similarly, the memory 422 does not store the dedicated client 324 but may store a browser application 424 which may be used with the web application 224 to conduct a second call in an end-to-end call with one or more of the first devices 101 via the server 103. However, in other examples, the example second device 102 may be configured to implement the second call without the browser application 424, for example upon receipt of the web application 224, which may comprise a stand-alone web application.

The controller 420 includes one or more logic circuits, one or more processors, one or more microprocessors, one or more ASIC (application-specific integrated circuits) and one or more FPGA (field-programmable gate arrays), and/or another electronic device. In some examples, the controller 420 and/or the example second device 102 is not a generic controller and/or a generic device, but a device specifically configured to implement functionality for conducting end-to-end calls with one or more of the first devices 101, including, but not limited to, group calls with the first devices 101, via the server 103. For example, in some examples, the example second device 102 and/or the controller 420 specifically comprises a computer executable engine configured to implement functionality for conducting end-to-end calls with one or more of the first devices 101, including, but not limited to, group calls with the first devices 101, via the server 103.

The static memory 422 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 4, programming instructions (e.g., machine readable instructions) that implement the functional teachings of the example second device 102 as described herein are maintained, persistently, at the memory 422 and used by the controller 420 which makes appropriate utilization of volatile storage during the execution of such programming instructions.

In particular, the memory 422 stores instructions corresponding to the application 423 that, when executed by the controller 420, enables the controller 420 to implement functionality for conducting end-to-end calls with the second device 102, including, but not limited to, group calls with other first devices 101, via the server 103. In illustrated examples, when the controller 420 executes the application 423, the controller 420 is enabled to: receive, via the communication unit 402, an identifier used to retrieve the web application 224 from the server 103; retrieve, via the communication unit 402, the web application 224; optionally authenticate with the server 103 (e.g. before or after retrieving the web application 224); and, when the authentication (when performed) is successful, establish a second call, of the end-to-end call, between the web application 224 and a call server at the server 103.

Figure 5:
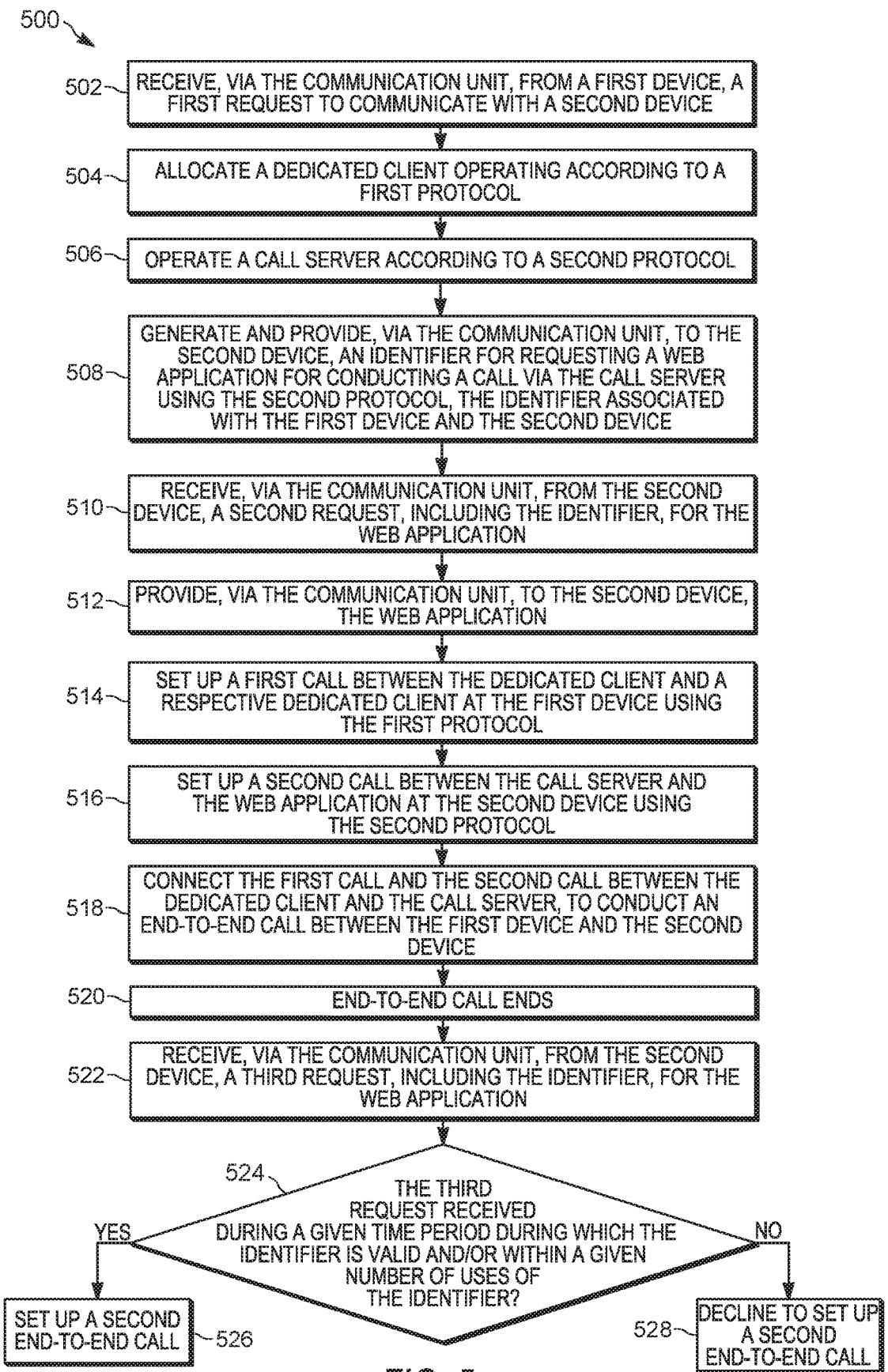
FIG. 5 depicts a flowchart of a method for communicating between devices using two protocols in accordance with some examples.

Attention is now directed to FIG. 5 which depicts a flowchart representative of a method 500 for communicating between devices using two protocols. The operations of the method 500 of FIG. 5 correspond to machine readable instructions that are executed by, for example, the example server 103 of FIG. 2, and specifically by the controller 220 of the example server 103 of FIG. 2. In the illustrated example, the instructions represented by the blocks of FIG. 5 are stored at the memory 222 for example, as the application 223. The method 500 of FIG. 5 is one way in which the controller 220 and/or the server 103 and/or the system 100 is configured. Furthermore, the following discussion of the method 500 of FIG. 5 will lead to a further understanding of the system 100, and its various components. However, it is to be understood that the method 500 and/or the system 100 may be varied, and need not work exactly as discussed herein in conjunction with each other, and that such variations are within the scope of present examples.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1, as well.

At a block 502, the controller 220 receives, via the communication unit 202 202, from a first device 101, a first request to communicate with the second device 102. The first request may include a selection of the expert 199 from the directory 225 by the first device 101, for example via the first device 101 interacting with the directory 225 via a webpage, an API, and the like.

At a block 504, the controller 220 allocates a dedicated client at the server 103 operating according to a first protocol. The dedicated client can be similar to the dedicated client 324 and, as allocated at the server 103 can comprise a temporary instance of the dedicated client operated by the controller 220. As such the application 223 may include a module, and the like, similar to the dedicated client 324. Furthermore, as described above, the first protocol may comprise one or more of an MC protocol, a 3GPP protocol, a VoIP protocol, an IMS protocol and the like. The dedicated client at the server 103 may be allocated and/or launched when the first request is received at the block 502 and/or the dedicated client at the server 103 may be allocated at any suitable time before, during or after receiving the first request at the block 502.

At a block 506, the controller 220 operates a call server according to a second protocol. As such the application 223 may include a module, and the like, corresponding to a call server which, when implemented, causes the controller 220 and/or the server 103 to operate the call server according to the second protocol. As described above, the second protocol may comprise a WebRTC protocol and hence the call server may comprise a WebRTC call server and/or a WebRTC media server. The call server at the server 103 may be operated and/or launched when the first request is received at the block 502 and/or the call server at the server 103 may be allocated at any suitable time before, during or after receiving the first request at the block 502.

At a block 508, the controller 220 generates and provides, via the communication unit 202, to the second device 102, an identifier for requesting a web application for conducting a call via the call server using the second protocol, the identifier associated with the first device 101 and the second device 102. The identifier may comprise a unique identifier and/or computationally unique identifier, and/or a unique random number, a hash, and the like which may be associated with the first device 101 and the second device 102 at the server 103. For example, such an identifier may be unique at the server 103 at least for a given time period and/or for a given number of uses; in these example the given time period and/or the given number of uses may be configurable, for example by a responder 104 and/or an administrator of the system 100.

Furthermore, the association between the identifier and the devices 101, 102 may be stored as state information at the server 103 (e.g. at the memory 222). Furthermore, the association between the identifier and the devices 101, 102 may occur in any suitable manner. For example, the association between the identifier and the second device 102 may occur via an association between the identifier and the expert 199 as selected from the directory 225; similarly, the association between the identifier and the second device 102 may occur via an association between the identifier and any data associated with the first request received at the block 502.

Furthermore, the controller 220 may incorporate the identifier into a respective network address of the web application 224 stored in the memory 222 accessible to the controller 220. The respective network address of the web application 224, into which the identifier is incorporated, may include, but is not limited to, a Universal Resource Locator (URL), and the like. The controller 220 may provide the identifier to the second device 102 by one or more of: transmitting, via the communication unit 202, the respective network address of the web application 224 to the second device 102 (e.g. via the messaging server 107), using the network address of the second device 102 as stored in the directory 225; and transmitting, via the communication unit 202, the respective network address of the web application 224 to the first device 101, the first device 101 providing the respective network address to the second device 102.

In the former example, the controller 220 may transmit the respective network address of the web application 224 to the second device 102 via one or more of an email, a text message, a social media post, a social media direct message, an instant message, and the like. Indeed, in some of these examples, the controller 220 may transmit the respective network address of the web application 224 to the second device 102 using more than one message and/or message type; for example, the controller 220 may transmit the respective network address of the web application 224 to the second device 102 via both an email and a text message. Such redundancy may be used to reduce latency between receiving the first request at the block 502, and setting up an end-to-end call between the first device 101 and the second device 102.

In the latter example, once the first device 101 receives the respective network address of the web application 224, the first device 101 may transmit the respective network address of the web application 224 to the second device 102 via an email, a text message, and the like, either automatically or upon receipt of input received via the input device 306.

At a block 510, the controller 220 receives, via the communication unit 202, from the second device 102, a second request, including the identifier, for the web application 224. For example, the second device 102 may receive the respective network address of the web application 224 and automatically request the web application using the respective network address. Alternatively, the second device 102 may provide a graphic user interface to the expert 199 at the display screen 405 which includes one or more selectable options, and the like, for accepting or declining a call with the first device 101; the second device 102 may transmit the second request, including the identifier, for the web application 224 upon activation of a selectable option for accepting a call with the first device 101.

At a block 512, the controller 220 provides, via the communication unit 202, to the second device 102, the web application 224, for example by transmitting the web application 224 to the second device 102. In some examples, the block 512 may include authenticating the second device 102, for example by receiving authentication data from the second device 102 including, but not limited to, login data, password data, biometric data such as an image that includes the face of the expert 199 and/or audio data that includes the voice of the expert 199; the authentication data received from the second device 102 may be compared with associated authentication information stored in the directory 225 to authenticate (or not authenticate) the second device 102. When the second device 102 is not authenticated, the method 500 may end prior to providing the web application 224 to the second device 102.

At a block 514, the controller 220 sets up a first call between the dedicated client at the server 103 and a respective dedicated client 324 at the first device 101 using the first protocol. The first call may comprise a private call between the first device 101, from which the request at the block 502 is received, and the second device 102. Alternatively, first call may comprise a group call that is further between the dedicated client at the server 103 and a plurality of first devices 101, including the first device 101, from which the request at the block 502 is received. The group call may be set up between one or more of the first devices 101 prior to the method 500 and/or while the controller 220 is setting up the first call. Such a group call may be set up by one or more of: initiating a group call between two or more of the first devices 101; and one or more of the first devices 101 affiliating to an existing call and/or group call between two or more of the first devices 101.

At a block 516, the controller 220 sets up a second call between the call server and the web application 224 at the second device 102 using the second protocol. In some example, the second call may comprise a peer-to-peer call between the second device 102 and the server 103 (e.g. the second device 102 may communicate with the server 103 as a peer device and/or the second protocol may comprise a peer-to-peer protocol; for example, WebRTC protocols are generally peer-to-peer protocols).

Setting up the first call and the second call is described in more detail below with respect to FIG. 6 and FIG. 7.

At a block 518, the controller 220 connects the first call and the second call between the dedicated client and the call server, to conduct an end-to-end call between the first device 101 and the second device 102. The end-to-end call may include exchange of one or more of audio data, video data and data in a file format, for example images, sound, text, data structures, files, streaming telemetry data, JavaScript Object Notation (JSON) objects and the like and/or the end-to-end call may include streaming data and/or the end. Hence, the first call set up at the block 514 may comprise a group call that is further between the dedicated client at the server 103 and a plurality of first devices 101, including the first device 101 (e.g. from which the request is received at the block 502), and the end-to-end call may include video data and/or streaming data between the plurality of first devices 101 and the second device 102. However, the group call also be an audio call without video. The end-to-end call may further comprise a private call between the first device 101 (e.g. from which the request is received at the block 502) and the second device 102 with, or without, video. Furthermore, while the present examples are described with respect to one second device 102, the system 100 may include two or more second devices 102, each provided with the identifier at the block 508, each requesting the identifier at the block 510, and each provided with the web application 224 at the block 512; hence, at the block 516, more than one second call may be set up between the call server and respective web application 224 at two or more second devices 102 using the second protocol, such that at the block 518 communications may occur between one or more first devices 101 and one or more second devices 102 using processes described herein.

Furthermore, the dedicated client at the server 103 may comprise a temporary dedicated client assigned a temporary network address 229 for use in the first call, the temporary network address selected from the pool 228 of the temporary network addresses 229, and the controller 220 may be further configured to: freeze the temporary network address 229 at the pool 228 at least during the end-to-end call; and unfreeze the temporary network address 229 at the pool 228 after one or more of: the end-to-end call ends; and a given time period (e.g. a time period during which the identifier is valid).

Furthermore, as will be described in more detail below, the first call may be conducted via the first protocol server 105 operating according to the first protocol, such that the end-to-end call includes: a first portion between the first device 101 and the first protocol server 105; a second portion between the first protocol server 105 and the dedicated client at the server 103; a third portion between the dedicated client at the server 103 and the call server at the server 103; and a fourth portion between the call server at the server 103 and the second device 102. In particular, the controller 220 is further configured to connect the first call and the second call by: translating respective packets and/or control signaling of each of the first call and the second call between the first protocol and the second protocol.

Furthermore, the controller 220 may be configured to one or more of: set up the first call after the second call is set up; set up the first call while the second call is being set up; and set up the first call before the second call is set up. Hence, the blocks 514, 516 may occur in any suitable order and/or in parallel.

Furthermore, while authenticating the second device 102 was described with respect to the block 508, the controller 220 may authenticate the second device 102 any time prior to setting up the second call.

At a block 520, the end-to-end call ends. For example, the second device 102 may end the second call and/or the first device 101 may end the first call.

In some examples, the method 500 may end at the block 520. However, in other examples, the identifier generated at the block 508 may be valid for a given time period, for example an hour, and/or any other suitable given time period. The given time period may be specified by the first device 101 (e.g. when transmitting the first request received at the server 103 at the block 502) and/or by an administrator of the system 100.

In examples where the identifier generated at the block 508 is valid for a given time period, at a block 522, the controller 220 may receive a third request, including the identifier, for the web application 224, from the second device 102.

At a block 524, the controller 220 determines whether the third request is received during a given time period, for example a time period during which the identifier is valid. Alternatively, at the block 524, the controller 220 determines whether the third request that includes the identifier is within a given number of uses of the identifier (e.g. in some examples the system 100 may be configured such that the identifier may be used only the given number of times).

When the third request is received during the given time period and/or the third request represents a use of the identifier that is less than or equal to the given number of uses (e.g. a "YES" decision at the block 524), at a block 526, the controller 220 sets up a second end-to-end call. For example, when the third request, including the identifier, is received for the web application 224 from the second device 102 during the given time period and/or the third request represents a use of the identifier that is less than or equal to the given number of uses, the controller 220: sets up a third call between the dedicated client and the respective dedicated client at the first device 101 using the first protocol; sets up a fourth call between the call server and the web application 224 at the second device 102 using the second protocol; and connects the third call and the fourth call between the dedicated client and the call server, to conduct the second end-to-end call between the first device 101 and the second device 102.

However, when the third request is not received during the given time period and/or the third request represents a use of the identifier that is greater than the given number of uses (e.g. a "NO" decision at the block 524), at a block 528, the controller 220 declines to set up the second end-to-end call. A person of skill in the art understands that the controller 220 may again implement the blocks 522, 524, 526 each time a request is received at the block 522 within the given time period, and/or until the given time period ends and/or expires; when the given time period ends and/or expires, and another request is received at the block 522, the controller 220 implements the block 528. However, the blocks 522, 524, 526, 528 may be optional, for example when the identifier generated at the block 508 is valid for one end-to-end call.

Figure 6:
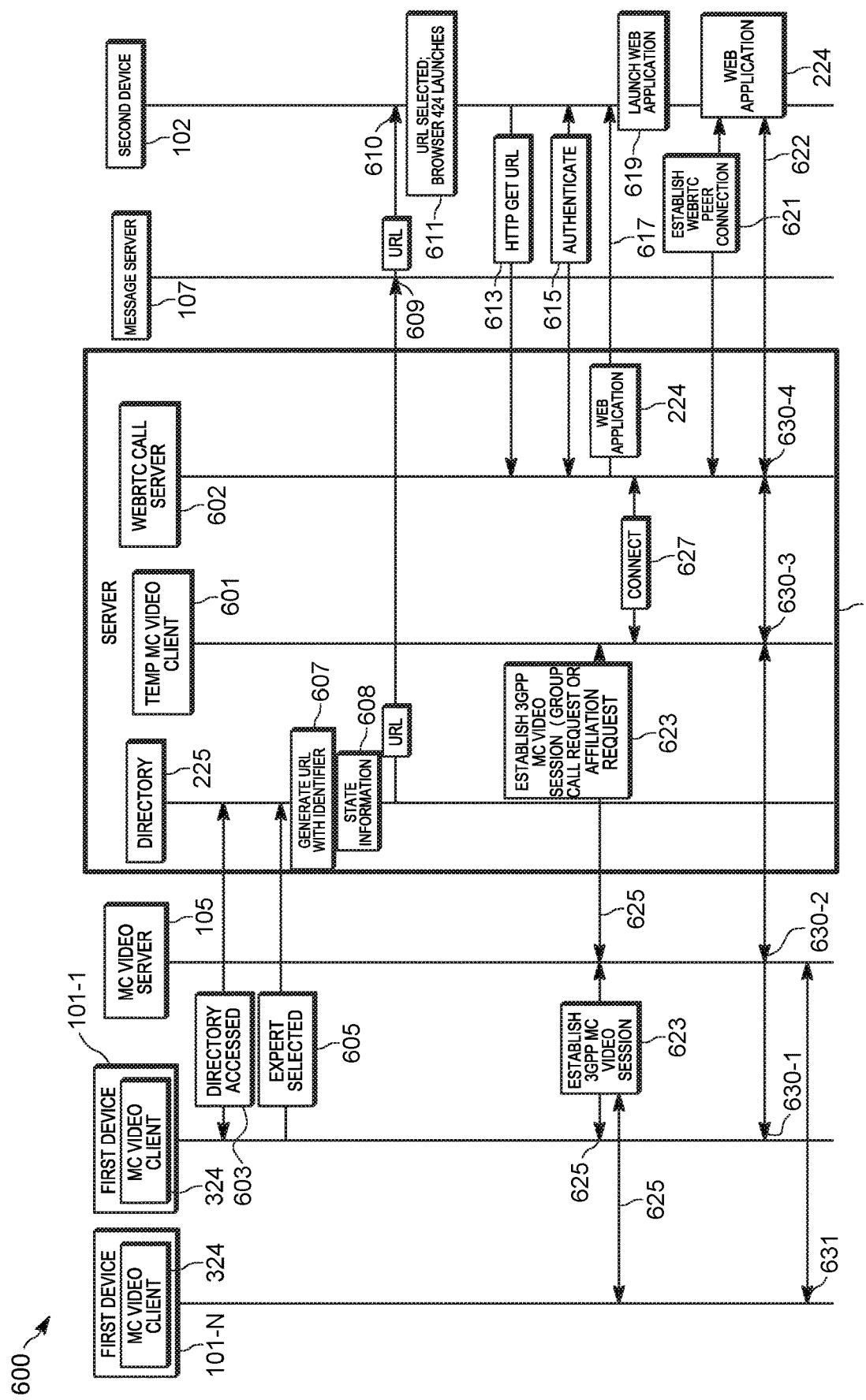
FIG. 6 is a signal diagram showing communication between components of the system of FIG. 1 when implementing a method for communicating between devices using two protocols in accordance with some examples.

Attention is next directed to FIG. 6 which depicts a signal diagram 600 showing communication between the components of the system 100 during execution of an example of the method 500 at the server 103. In particular the signal diagram 600 will be described with respect to the first protocol of the method 500 comprising the MC video protocol using 3GPP, and the second protocol of the method 500 comprising the WebRTC protocol. As depicted, the signal diagram 600 further shows components of the server 103 including: the directory 225, a temporary MC Video client 601, allocated at the block 504 of the method 500, and a WebRTC call server 602 and/or WebRTC media server, operated at the block 506.

Signal flow of the communications will now be described with respect to the first device 101-1 requesting to communicate with the second device 102, and optionally in a group call with the first device 101-N (and/or a plurality of first devices 101). Hence, in some examples, a group call between the first devices 101-1, 101-N may have been previously established.

The first device 101-1 accesses 603 the directory 225 at the server 103, for example via a web interface and/or the respective MC Video client and/or respective dedicated client 324, and the expert 199 operating the second device 102 is selected 605 at the directory 225. Such a selection can occur at the block 502 of the method 500 and is indicative of receiving a first request, at the server 103, from the first device 101-1, to communicate with the second device 102. For example, the responder 104-1 operating the first device 101-1 may interact with the first device 101-1 to cause the first device 101-1 to make the selection 605.

Such a selection 605 can cause the server 103 to allocate the temporary MC Video client 601 at the block 504 of the method 500, and assign a temporary network address 229 thereto from the pool 228; the temporary network address 229 assigned to the temporary MC Video client 601 is frozen at the pool 228. However, the server 103 already be operating the WebRTC call server 602 when the selection 605 occurs; hence, a person of skill in the art understands that the block 506 of the method 500, may have occurred before the block 502 and the block 504 of the method 500.

Furthermore, in other examples, rather than a selection of the expert 199 occurring via the selection 605 at the directory 225, the expert 199 may be selected by the first device 101-1 transmitting a network address of the second device 102 to the server 103.

Regardless, selection of the expert 199 causes the server 103 to generate 607 (e.g. at the block 508 of the method 500) a network address of an instance of the web application 224. As depicted the network addresses that is generated comprises a URL, that includes an identifier that is unique for the expert 199 and/or the second device 102 and which is further associated with the first device 101-1 and the second device 102, for example via state information 608 stored at the server 103 when the URL is generated.

For example, the URL may have a structure of: www-.callserveraddress.com/uiwef99234, where "www-.callserveraddress.com" is mapped to an internet protocol address of the WebRTC call server 602, and "uiwef99234" is a unique identifier (and/or at least a computationally unique identifier), and which may comprise a random number, a hash, and the like generated by the server 103. While the signal diagram 600 depicts the URL being generated at the directory 225, a person of skill in the art understands that the URL is generated by the controller 220 at the block 508, and depiction of the generation of the URL at the directory 225 merely indicates that, in some examples, the URL and/or the identifier is generated in conjunction with the selection 605 of the expert 199 at the directory 225.

As depicted, the server 103 accesses one or more network addresses of the second device 102, associated with the expert 199 at the directory 225, and the URL (with the identifier) is transmitted 609 (e.g. also at the block 508 of the method 500) to the message server 107 as an email and/or text message and/or in a direct message (and/or instant message) in a social media platform and/or as a post in the social media platform and the like, and the like, addressed to the second device 102 via the one or more network addresses of the second device 102. The message server 107 transmits 610 the URL to the second device 102 again using the one or more network addresses of the second device 102.

The second device 102 receives the URL, for example in an email and/or text message and/or in a direct message in a social media platform and/or as a post in the social media platform and the like, and the expert 199 may operate the second device 102 to access the email and/or text message and/or the direct message and/or the post, and "open" and/or select the URL (e.g. via the input device 406), which may cause the browser application 424 to launch 611 to request the URL from the Web RTC call server 602. Alternatively, the browser application 424 may be launched automatically at the second device 102 upon receipt of the email and/or text message and/or the direct message which includes the URL.

As depicted, the Hypertext Transfer Protocol (HTTP) is used to request and/or retrieve and/or get the instance of the web application 224 identified by the identifier generated 607 by the server 103 and incorporated into the URL, such that the server 103 receives a second request 613 for the web application 224 (e.g. at the block 510 of the method 500) via the WebRTC call server 602.

As depicted an optional authentication 615 occurs in response to the WebRTC call server 602 receiving the second request 613, in which an exchange of authentication data occurs between the second device 102 and the server 103 and/or the WebRTC call server 602. When the authentication 615 fails, the exchange of authentication data may include messaging to the second device 102 indicating a failure and the method 500 may end; such a failure may also cause the server 103 to message the first device 101-1 to indicate such a failure.

However, when the authentication 615 is successful, the WebRTC call server 602 transmits and/or provides 617 the web application 224 identified by the URL to the second device 102 (e.g. at the block 512 of the method 500), which launches 619 the web application 224 (e.g. via the browser application 424). The WebRTC call server 602 and the web application 224 at the second device 102 establishes 621 a WebRTC peer connection 622 which may correspond to the second call of the block 516 of the method 500.

As depicted, once the WebRTC peer connection 622 is set up, the server 103 causes the temporary MC Video client 601 to establish a 3GPP MC video session with the first device 101-1 (and, as depicted, optionally also with one or more other first devices 101, such as the first device 101-N) by establishing 623 a 3GPP MC video session 625 with the MC video server 105 (e.g. using the state information 608 that associates the URL and/or the identifier that was generated 707 with the first device 101-1 and the second device 102), to determine that the WebRTC peer connection 622 is to be connected to the first device 101-1. When a new group call is to be established, establishing the 3GPP MC video session 625 may occur via a group call request; however, when an existing group call is to be joined (e.g. between the first devices 101-1, 101-N), establishing the 3GPP MC video session 625 may occur via an affiliation request (e.g. to affiliate with an existing group call).

The MC video server 105 establishes a 3GPP MC video session 625 with the first device 101-N (e.g. the MC Video client and/or dedicated client 324 at the first device 101-1), and optionally the first device 101-N (e.g. the MC Video client and/or dedicated client 324 at the first device 101-N).

In some examples, the 3GPP MC video session 625 is established with the first device 101-1 in the form of a "call" to the first device 101-1, such that the responder 104-1 operating the first device 101-1 experiences the establishment of the 3GPP MC video session 625 as in in-coming call that may be accepted, for example by the responder 104-1 interacting with touch-screen selectable options, and the like, at a graphic user interface at the respective display screen 305.

The 3GPP MC video session 625 generally corresponds to the first call of the block 514 of the method 500; hence, in the depicted example, the block 516 occurs before the block 514, and the first call (e.g. the 3GPP MC video session 625) is set up after the second call (e.g. the WebRTC peer connection 622). Alternatively, the 3GPP MC video session 625 may be established while the WebRTC peer connection 621 is being set up such that the block 514 and the block 516 occurs in parallel, and the first call is set up while the second call is being set up.

Once the 3GPP MC video session 625 is established, the server 103 establishes a connection 627 between the 3GPP MC video session 625 and the WebRTC Peer connection 622, for example between the temporary MC Video client 601 and the WebRTC call server 602, for example by translating packets and/or control signaling between the MC video protocol and the WebRTC protocol (and/or by translating packets between the first protocol and the second protocol of the method 500). It is understood by persons of skill in the art that such packets may include control packets and media and/or content packets, and that the WebRTC protocol only specifies media packets and not control packets; rather, as the WebRTC protocol does not generally specify control signaling, the server 103 may include any suitable packet-based signaling protocol for use with the WebRTC protocol to specific the control signaling. However the MC video protocol provides control signaling in the form of packets. Hence the server 103 may strip control packets from packets transmitted to the second device 102 from the first devices 101-1, 101-N; translate the stripped control packets to a packet-based control protocol used with the WebRTC protocol; and add control packets to packets transmitted to the first devices 101-1, 101-N from the second device 102, and the like. An example of such translation is described below with respect to FIG. 8.

Furthermore, the connection 627 may be established using a port number and/or other endpoint information of the 3GPP MC video session 625. The connection 627 may also be a programmatic interface provided within operating software of the server 103.

Hence, an end-to-end call is established between the first device 101-1 (and optionally the first device 101-N) and the second device 102; the end-to-end call comprises: a first portion 630-1 between the first device 101-1 and the MC video server 105 (e.g. the 3GPP MC video session 625); a second portion 630-2 between the MC video server 105 and the temporary MC Video client 601 (e.g. the 3GPP MC video session 625); a third portion 630-3 between the temporary MC Video client 601 and the WebRTC call server 602 (e.g. the connection 627); and a fourth portion 630-4 between the WebRTC call server 602 and the second device 102 (e.g. the WebRTC peer connection 622). As depicted, the end-to-end call includes a fifth portion 631 between the first device 101-N and the MC video server 105 (e.g. the 3GPP MC video session 625 portion with the first device 101-N) such that the end-to-end call comprises a group call.

Furthermore, audio data, video data and/or other types of data may be exchanged in the end-to-end call. For example, persons skilled in the art understand an RTCDataChannel may be established between the WebRTC call server 602 and web application 224 at the second device 102 in the WebRTC peer connection 622, and that the RTCDataChannel can be associated with and/or connected 627 to a 3GPP Session Initiation Protocol (SIP) session between the temporary MC Video client 601 and the MC Video client and/or dedicated client 324 at the first device 101-1 in the the 3GPP MC video session 625) for the purposes of exchanging data (location, images, documents, etc.).

Hence, as described above, the generated URL points to the WebRTC call server 602 such that the web application 224 is downloaded to conduct the end-to-end call. Hence, the MC Video client does not need to be installed on the second device 102 to participate in an MC video group chat. Furthermore, the data exchanged between the first device 101-1 and the second device 102 in establishing the end-to-end call can exclude information identifying a telephone number and the like of the first device 101-1, such that the second device 102 cannot be later used to call the first device 101-1 using such a telephone number. Rather, communications between the devices 101-1, 102 occur via the URL, which may be valid for a single use or a limited given time period. Hence a person of skill in the art understands that the URL does not reveal the identity or personal information of the responder 104-1; however, in some examples, a name and/or rank of the responder 104-1 may be provided to the second device 102.

Furthermore, the server 103 may decline further requests for the web application 224, for example, when the URL is used at more than once device to request the web application 224. For example, the expert 199 may forward the URL from the second device 102 to another device (e.g. when the expert 199 does not wish to communicate with responder 104-1, but may know another expert who is more suitable) which may alternatively use the URL to establish a WebRTC peer connection with the WebRTC call server 602; however, when the WebRTC peer connection 622 has already been established with the second device 102, further requests to use the URL to establish another WebRTC peer connection with another device are declined.

Once the end-to-end call ends (e.g. at the block 520 of the method 500), for example when one or more of the WebRTC peer connection 622 and the 3GPP MC video session 625 end, the signaling of the signal diagram 600 may be repeated (e.g. at the block 522, the block 524 and the block 526) when the first device 101-1 again selects the expert 199 at the directory 225, using the same URL previously generated 607, for example the second selection occurs within a given time period, such as an hour from the first selection and/or an hour from the end-to-end call ending. Hence, the URL may be stored for a given time period (e.g. an hour) during which the URL and the associated identifier is valid. Thereafter, when another selection occurs, another URL and identifier is generated.

While the signal diagram 600 depicts the first call being set up after the second call, in other examples, the first call may be set up before the second call.

Figure 7:
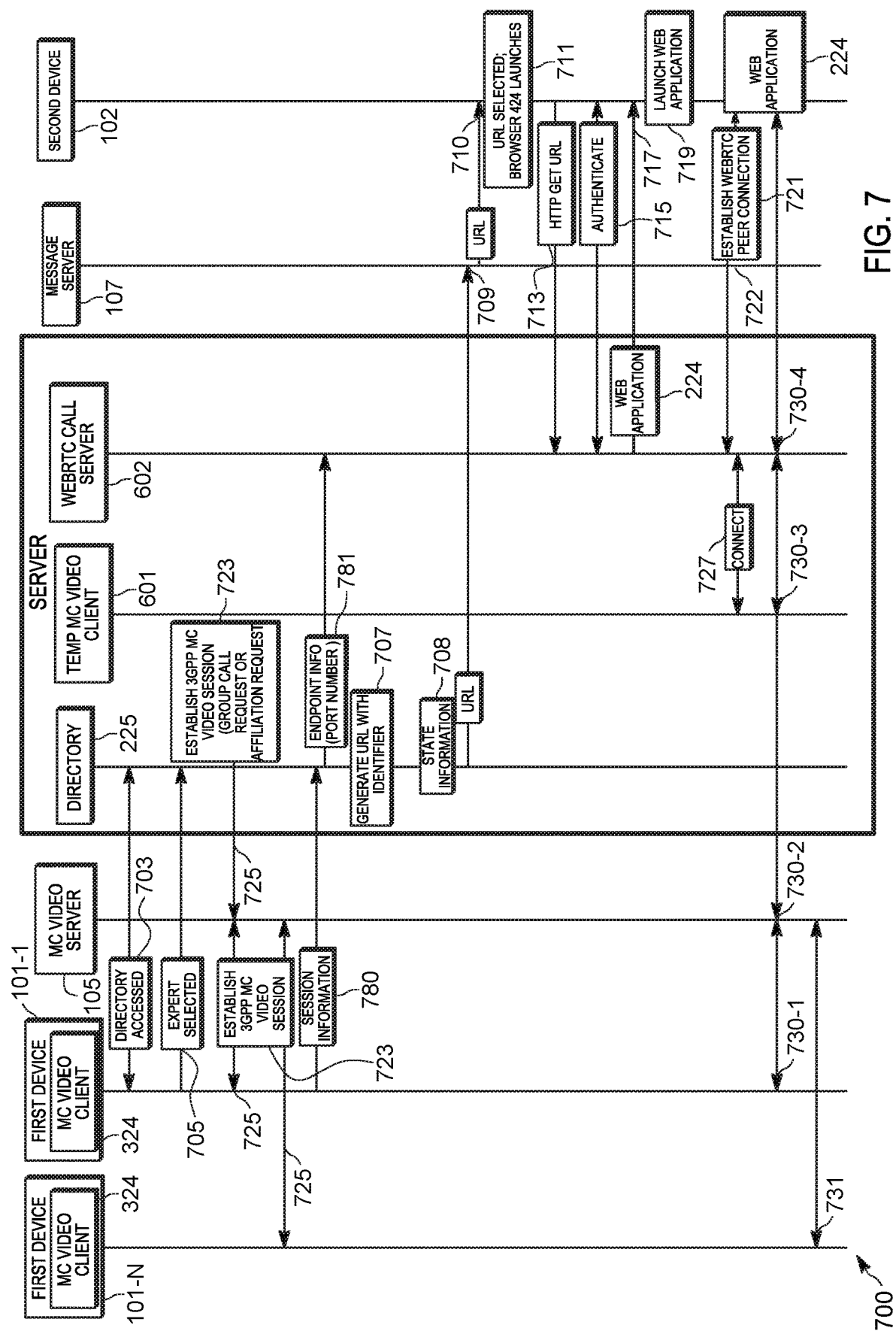
FIG. 7 is a signal diagram showing communication between components of the system of FIG. 1 when implementing a method for communicating between devices using two protocols in accordance with some alternative examples.

For example, attention is next directed to FIG. 7 which depicts a signal diagram 700 showing communication between the components of the system 100 during execution of another example of the method 500 at the server 103. The signal diagram 700 is substantially similar to the signal diagram 600 with like signaling and/or steps having like numbering however in a "700" series rather than a "600" series. However, in the signal diagram 700, the first call of the block 514 is set up prior to the second call of the block 516.

Hence, for example, while the accessing 703 the directory 225 and the selection 705 of the expert 199 (e.g. receipt of the first request at the block 502 of the method 500) is similar to that described with reference to the signal diagram 600, once the expert 199 is selected, the server 103 establishes 723 a 3GPP MC video session 725 between the temporary MC Video client 601 and the first device 101-1, and optionally the first device 101-N, as described above. Hence, the first call of the block 514 of the method 500 is set up before the second call of the block 516.

The first device 101-1 (e.g. the MC Video client and/or dedicated client 324 at the first device 101-1) may then transmit session information 780 to the server 103, such as a port number, and/or other endpoint information, of the 3GPP MC video session 725 and the server 103 provides 781 such endpoint information to the WebRTC call server 602. The server 103 may generate 707 the URL with the identifier as described above in the signal diagram 600 and similarly store state information 708. The URL is transmitted 709 to the message server 107, which transmits 710 the URL to the second device 102.

The URL is selected 711 at the second device 102, and the browser application 424 may be launched to transmit a second request 713 to the Web RTC call server 602, which optionally authenticates 715 the second device 102 before transmitting 717 the web application 224 to the second device 102. The second device 102 launches 719 the web application 224 and establishes 721 a WebRTC peer connection 722 (e.g. the second call of the block 516 of the method 500) is established between the WebRTC call server 602 and the web application 224 at the second device 102.

The server 103 establishes a connection 727 between the 3GPP MC video session 725 and the WebRTC peer connection 722 as described above, to establish an end-to-end call comprising: a first portion 730-1 between the first device 101-1 and the MC video server 105 (e.g. the portion of the 3GPP MC video session 725 between the first device 101-1 and the MC video server 105); a second portion 730-2 between the MC video server 105 and the temporary MC Video client 601 (e.g. the portion of the 3GPP MC video session 725 between the MC video server 105 and the temporary MC Video client 601); a third portion 730-3 between the temporary MC Video client 601 and the WebRTC call server 602 (e.g. the connection 727); and a fourth portion 730-4 between the WebRTC call server 602 and the second device 102 (e.g. the WebRTC peer connection 722). As depicted, the end-to-end call includes a fifth portion 731 between the first device 101-N and the MC video server 105 (e.g. the 3GPP MC video session 725 portion with the first device 101-N) such that the end-to-end call comprises a group call.

Figure 8:
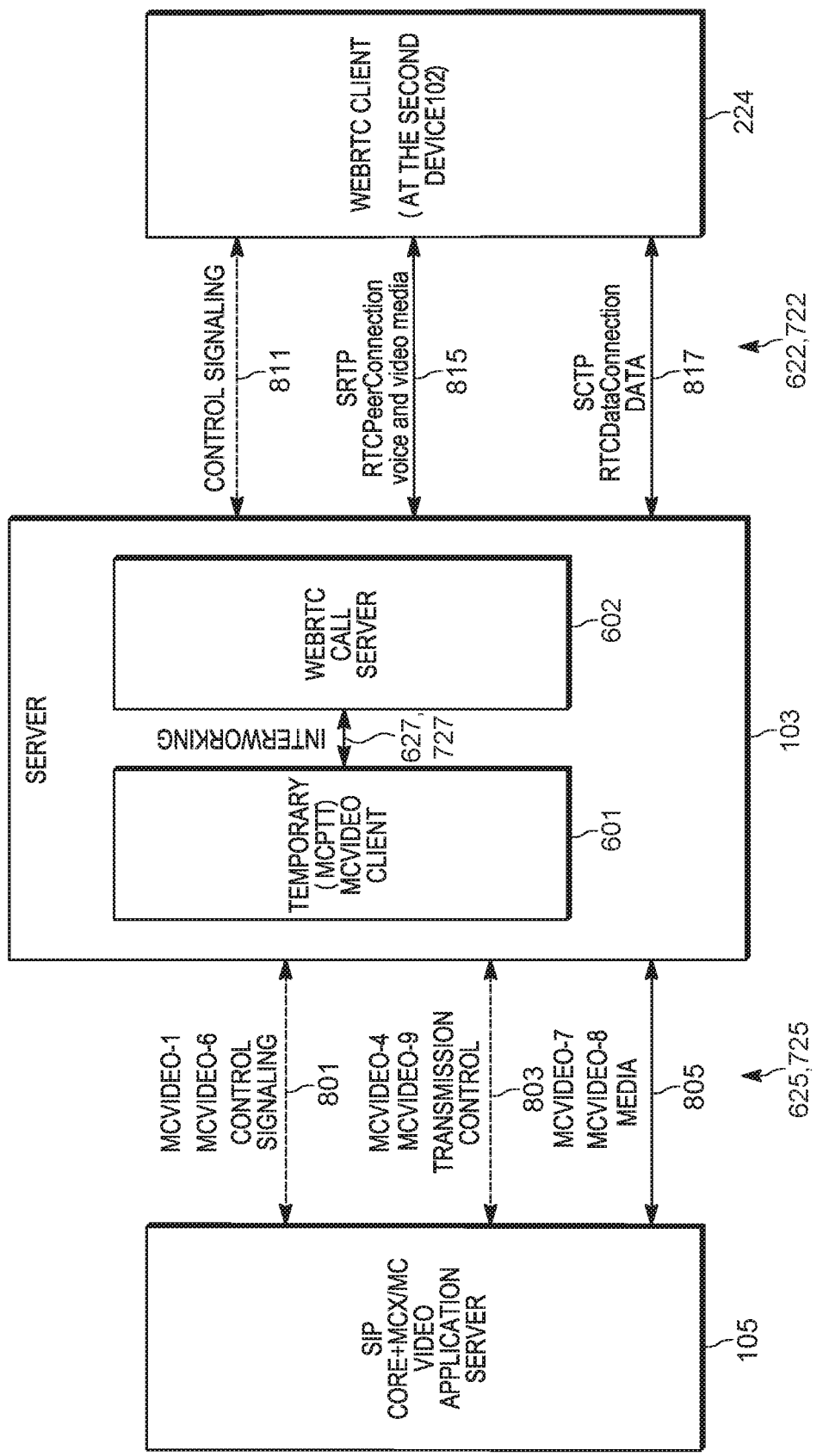
FIG. 8 depicts communications in an end-to-end call between two devices of the system of FIG. 1 using two protocols in accordance with some examples.

Attention is next directed to FIG. 8 which depicts a block diagram of communications between the MC video server 105, the temporary MC Video client 601 and the Web RTC call server 602 at the server 103, and the web application 224 at the second device 102 during the end-to-end call established using either of the alternatives depicted in the signal diagram 600 or the signal diagram 700. In particular communications of each of the 3GPP MC video sessions 625, 725 and the WebRTC peer connections 622, 722 are shown.

In FIG. 8, the MC video server 105 is also referred to as a SIP Core server and/or an MCX server, indicating that the MC video server 105 may be implemented using SIP protocols and/or any type of MCX server, including, but not limited to, an MCPTT server. Similarly, in FIG. 8, the temporary MC Video client 601 is also referred to as an MCPTT client.

FIG. 8 further depicts the connections 627, 727 between the temporary MC Video client 601 and the Web RTC call server 602 which may comprise internetworking therebetween.

In particular, the 3GPP MC video session 625, may include MCVideo-1 and MCVideo-6 control signaling 801 as well as MCVideo-4 and MCVideo-9 transmission control signaling 803. The signaling 801, 803 comprises control packets for controlling exchange of video data, and other media (e.g. files and the like), over a media connection 805 in the 3GPP MC video sessions 625, 725, such as MCVideo-7 and MCVideo-9 video.

Similarly, the WebRTC peer connections 622, 722 include control signaling 811, and exchange of video data and/or voice/audio data in a Secure Real-Time Transport Protocol (SRTP) RTCPeerConnection 815, and exchange of data (e.g. files and the like) in a Stream Control Transmission Protocol (SCTP) RTCDataConnection 817.

The server 103 generally translates between the control signaling 801, 803 and the control signaling 811, and further translates between the respective formats of the media connection 805 and the connections 815, 817. For example, voice and files received in the media connection 805 at the temporary MC Video client 601 may be separated for transmission on the respective connections 815, 817, and voice and files received on the respective connections 815, 817 at the WebRTC call server 602 may be combined for transmission over the media connection 805.

In accordance with the present specification, the first call and the second call of the end-to-end call between first device 101 and the second device 102. as described above with respect to the method 500, the signal diagram 600, and signal diagram 700, may be set up in any suitable order and in one-on-one calls and group calls, and which may depend on a configuration of the system 100. Various graphical user interfaces (GUIs) are now described with respect to various use scenarios of the method 500 with respect to FIG. 9, FIG.

10, FIG. 11, FIG. 12, FIG. 13, and FIG. 14, and which depict various examples of setting up one-on-one calls and group calls.

Figure 9:
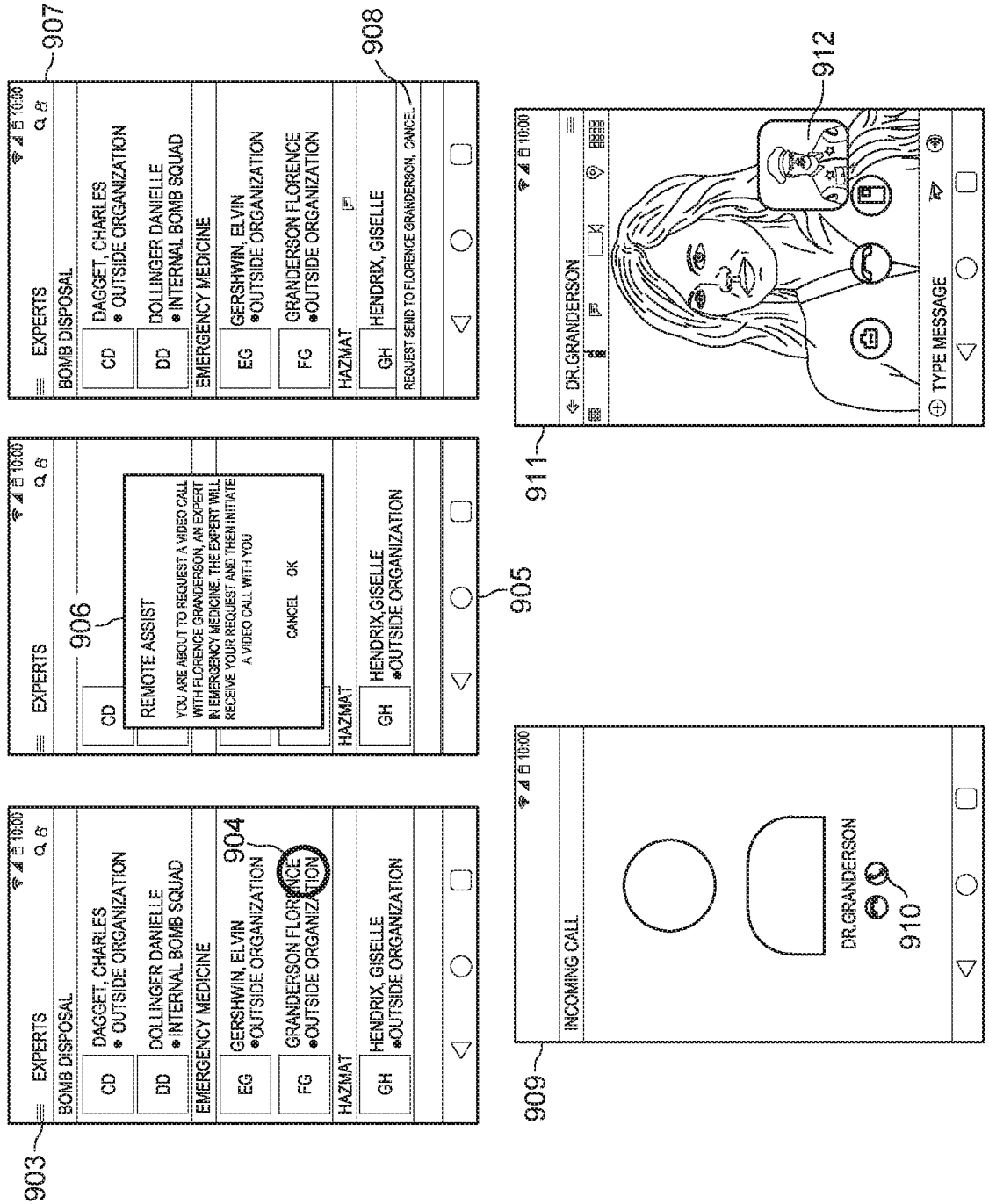
FIG. 9 depicts graphic user interfaces provided at the first device of FIG. 3 when a one-to-one end-to-end call is being established with the second device of FIG. 4 in accordance with some examples.
Figure 10:
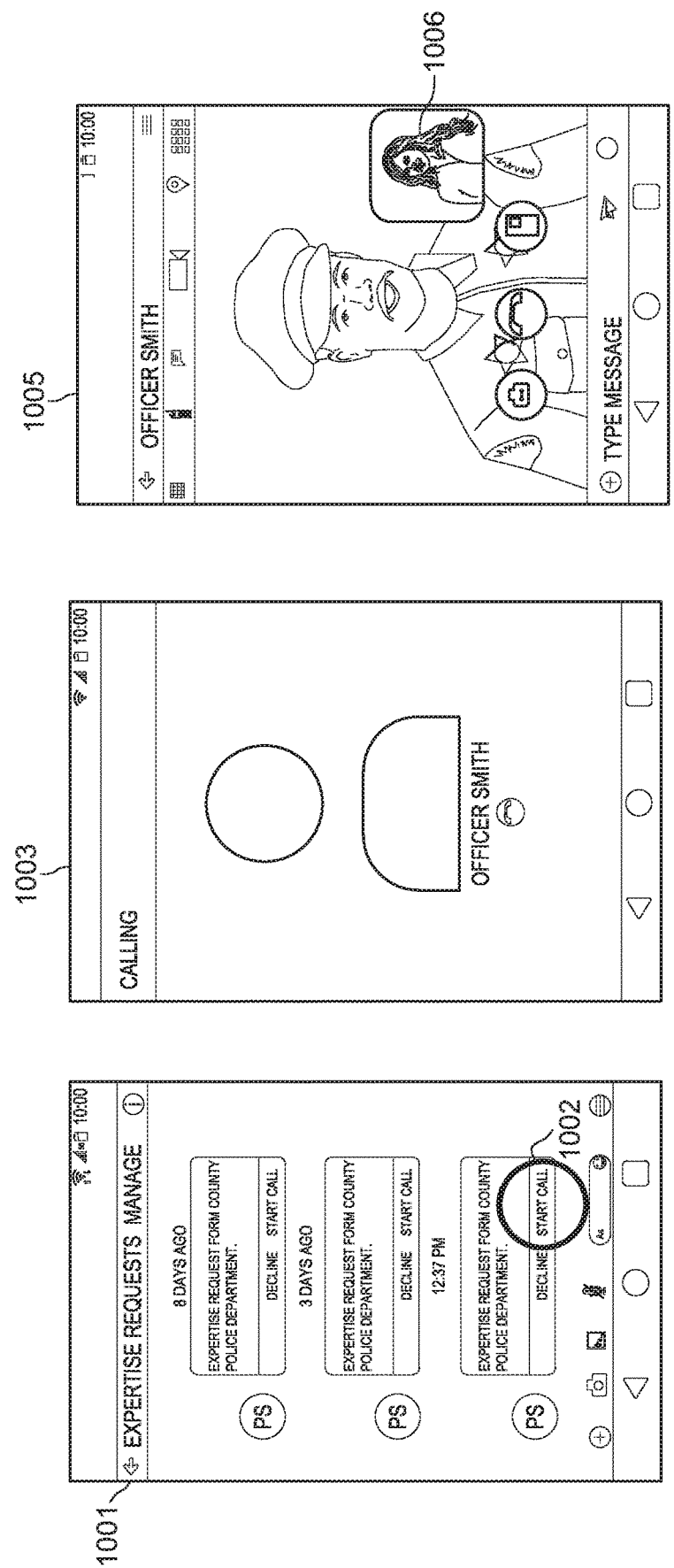
FIG. 10 depicts graphic user interfaces provided at the second device of FIG. 4 when a one-to-one end-to-end call is being established with the first device of FIG. 3 in accordance with some examples.

Attention is next directed to FIG. 9 and FIG. 10 which depict respective GUIs which may be provided at the respective display screens 305, 405 of the first device 101-1 and the second device 102 when setting up a one-to-one end-to-end call therebetween using the method 500 according to the signal diagram 600. In particular FIG. 9 depicts GUIs at the display screen 305 of the first device 101-1, and FIG. 10 depicts GUIs at the display screen 405 of the second device 102. It is understood in each of the examples of FIG. 9 and FIG. 10 that the respective display screens 305, 405 each comprise respective touch-screens. It is further understood in each of the examples of FIG. 9 and FIG. 10 that initially no call has been established between the first device 101-1 and any of the other first devices 101 (e.g. no group call is in progress).

With attention first directed to FIG. 9, a GUI 903 may be provided showing entries in the directory 225, for example, when responder 104-1 operates the first device 101-1 to navigate to the directory 225. As depicted, the responder 104-1 may select an entry corresponding to the expert 199, as depicted, "Florence Granderson", for example by tapping on the entry, as represented by touch-screen input 904.

In response, a GUI 905 is provided which includes text 906 indicating selection of the expert 199 and/or that a call and/or video call to the second device 102 of the expert 199 is being requested, as well as selectable options to cancel (e.g. "Cancel") or connect (e.g. "OK") with the expert 199. Assuming that the connect (e.g. "OK") option has been selected, the server 103 begins to initiate the first call and the second call. An optional GUI 907 may be provided that includes a selectable option 908 to "Cancel" the call to the expert 199, for example within a given period of time, such as 5 to 10 seconds and/or any other suitable given time period.

When the call to the expert 199 is not cancelled, the server 103 begins to initiate the first call and the second call by transmitting the URL (e.g. as described above with respect to the transmit 610 of the URL to the second device 102 in FIG. 6) to the second device 102 and the expert 199 may cause the first call and the second call to initiate by activating a selectable option mapped to the URL provided by the second device 102 (e.g. see the GUI 1001 described below). It is understood that when the expert 199 initiates the first call and the second call, the WebRTC peer connection 622 (e.g. the second call) is established between the second device 102 and the WebRTC call server 602, and the MC video server 105 begins to establish the 3GPP MC video session 625 (e.g. the first call). Hence, the first device 101-1 may receive a call request (e.g. to establish a new call), for example as represented by a GUI 909 which has a format of an incoming call from the expert (e.g. "Dr. Granderson"). A selectable option 910 to accept the call may be selected via touch-screen input to complete establishment of the 3GPP MC video session 625 and the end-to-end call such that a GUI 911 is provided at the first device 101-1 to conduct the one-on-one end-to-end call with the second device 102. As depicted, the GUI 911 may include video of the expert 199, inset video 912 of the responder 104-1 using the first device 101-1 as well as selectable options controlling the call, including, but not limited to, a selectable option for ending the call, and the like.

Similarly, with reference to FIG. 10, when the URL is received at the second device 102, for example in a text message and the like (e.g. as described above), a GUI 1001 may be provided with a selectable option to "Decline" a call from the first device 101-1 and a selectable option "Start Call" to start the call with the first device 101-1. A person of skill in the art understands that the selectable option "Start" may be mapped to the URL, such that when "Start Call" is selected via touch-screen input 1002, the web application 224 is retrieved and launched to "call" the first device 101-1, as depicted in a GUI 1003 (which also causes the GUI 909 to occur at the first device 101-1). While not depicted, optional authentication may occur. When the end-to-end call is established, as described above, a GUI 1005 is provided, corresponding to the GUI 911, to conduct the end-to-end call at the second device 102. In particular, while the GUI 1005 includes a name and the like of the responder 104-1 (e.g. "Office Smith"), information identifying the first device 101-1, such as a telephone number, a network address, and the like, is not provided. The GUI 1005 further includes video of the responder 104-1 and inset video 1006 of the expert 199, as well as selectable options controlling the call, including, but not limited to, a selectable option for ending the call, and the like.

Figure 11:
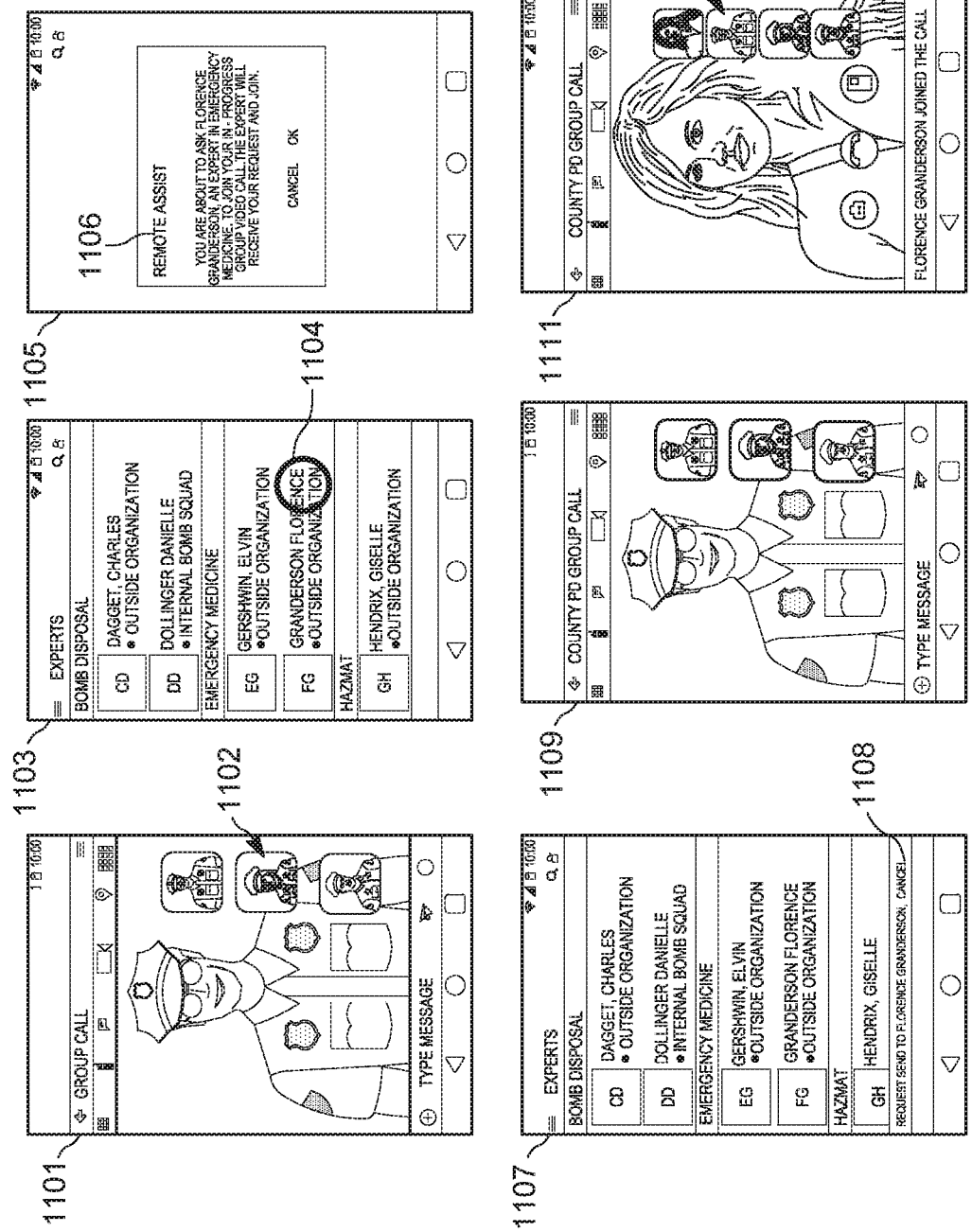
FIG. 11 depicts graphic user interfaces provided at the first device of FIG. 3 when an end-to-end call is being established with the second device of FIG. 4, during an existing group call, in accordance with some examples.
Figure 12:
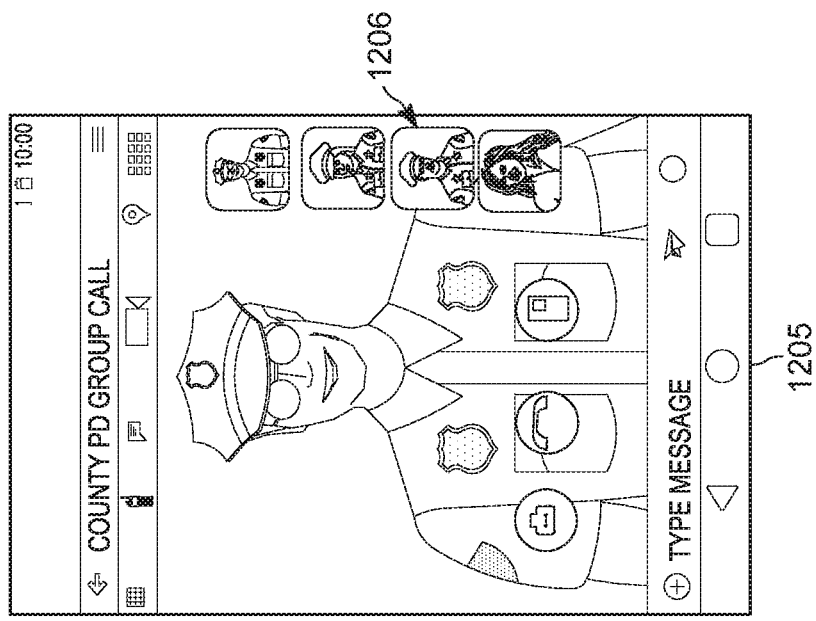
FIG. 12 depicts graphic user interfaces provided at the second device of FIG. 4 when an end-to-end call is being established with the first device of FIG. 3, during an existing group call, in accordance with some examples.
Figure 12:
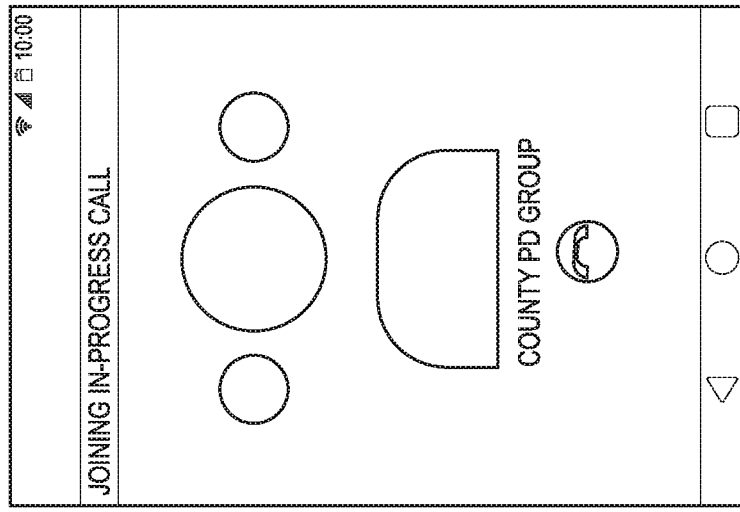
Figure 12:
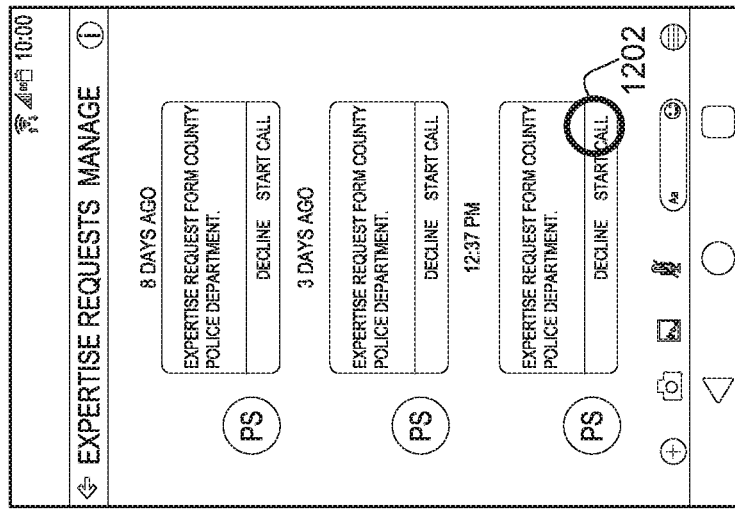

Attention is next directed to FIG. 11 and FIG. 12 which depict respective GUIs which may be provided at the respective display screens 305, 405 of the first device 101-1 and the second device 102 when setting up an end-to-end call therebetween, using the method 500 according to the signal diagram 700, after a group call has been established between the first device 101-1 and one or more of the other first devices 101 using the first protocol. In particular FIG. 11 depicts GUIs at the display screen 305 of the first device 101-1, and FIG. 12 depicts GUIs at the display screen 405 of the second device 102. It is understood in each of the examples of FIG. 11 and FIG. 12 that the respective display screens 305, 405 each comprise respective touch-screens.

It is further understood in each of the examples of FIG. 11 and FIG. 12 that initially a group call has been established between the first device 101-1 and at least one of the other first devices 101. For example, with attention directed to FIG. 11, when a group call is established between the first device 101-1 and one or more of the other first devices 101 using the first protocol (e.g. a 3GPP MC video protocol), a GUI 1101 may be provided at the first device 101-1 that includes video of one of the responders 104 operating one of the other first devices 101 in the group call (e.g. other than the responder 104-1), as well as inset video 1102 that includes video of the responder 104-1 and other responders 104 in the group call.

While in the group call, the first device 101-1 may be operated by the responder 104-1 (e.g. via a menu system and the like), to provide a GUI 1103 showing entries in the directory 225 similar to the GUI 903. As depicted, the responder 104-1 may select an entry corresponding to the expert 199, as depicted, "Florence Granderson", for example by tapping on the entry, as represented by touch-screen input 1104.

In response, a GUI 1105 is provided which includes text 1106 indicating selection of the expert 199 and that the second device 102 of the expert 199 will be requested to join the group call, as well as selectable options to cancel (e.g. "Cancel") or connect (e.g. "OK") with the expert 199. Assuming that the connect (e.g. "OK") option has been selected, the server 103 begins to initiate the first call and the second call. An optional GUI 1107 may be provided that includes a selectable option 1108 to "Cancel" the call to the expert 199, for example within a given period of time, such as 5 to 10 seconds and/or any other suitable given time period.

When the call to the expert 199 is not cancelled, the server 103 begins to initiate the first call and the second call by transmitting the URL (e.g. as described above with respect to the transmit 610, 710 of the URL to the second device 102 in FIG. 6 and FIG. 7) to the second device 102 and the expert 199 may cause the first call and the second call to initiate by activating a selectable option to join the group call mapped to the URL provided by the second device 102 (e.g. see the GUI 1201 described below). It is understood that when the expert 199 initiates the first call and the second call, the WebRTC peer connection 622 (e.g. the second call) is established between the second device 102 and the WebRTC call server 602, and the MC video server 105 begins to establish the 3GPP MC video session 625 (e.g. the first call) using a group affiliation request. Hence, the MV Video server 105 may receive a group affiliation request to add the associated temporary MC Video client 601 (e.g. associated with the second device 102) to the group call. While such a group affiliation is being established, a GUI 1109 is provided, similar to the GUI 1101, such that the responder 104-1 may continue with the existing group call.

Once the group affiliation occurs, and the associated temporary MC Video client 601 joins the group call, a GUI 1111 is provided at the first device 101-1 that is similar to the GUIs 1101, 1109, to conduct the end-to-end call with the second device 102. As depicted, the GUI 1111 may include video of the expert 199, inset video 1112 of the responders 104 on the group call as well as selectable options controlling the call, including, but not limited to, a selectable option for ending the call, and the like.

Similarly, with reference to FIG. 12, when the URL is received at the second device 102 (e.g. as described above with respect to the transmit 710 of the URL to the second device 102 in FIG. 7), for example in a text message and the like (e.g. as described above), a GUI 1201 may be provided with a selectable option to "Decline" a call from the first device 101-1 and a selectable option "JOIN CALL" to the join the group call that includes the first device 101-1. A person of skill in the art understands that the selectable option "JOIN CALL" may be mapped to the URL, such that when "JOIN CALL" is selected via touch-screen input 1202, the web application 224 is retrieved and launched to "call" the first device 101-1, and/or be included in the existing group call, as depicted in a GUI 1203. While not depicted, optional authentication may occur. When the end-to-end call is established, as described above, a GUI 1205 is provided, corresponding to the GUI 1111, to conduct the end-to-end call at the second device 102. In particular, while the GUI 1205 includes a name and the like associated with the responders in the existing group call (e.g. "Count PD Group Call"), information identifying the first device 101-1 and/or other first devices 101 in the group call, such as telephone numbers, network addresses, and the like, is not provided. The GUI 1205 further includes video of the existing group call (e.g. similar to the GUI 1111) and inset video 1206 of the expert 199 and other responders 104 on the existing group call, as well as selectable options controlling the call, including, but not limited to, a selectable option for ending the call, and the like.

Figure 13:
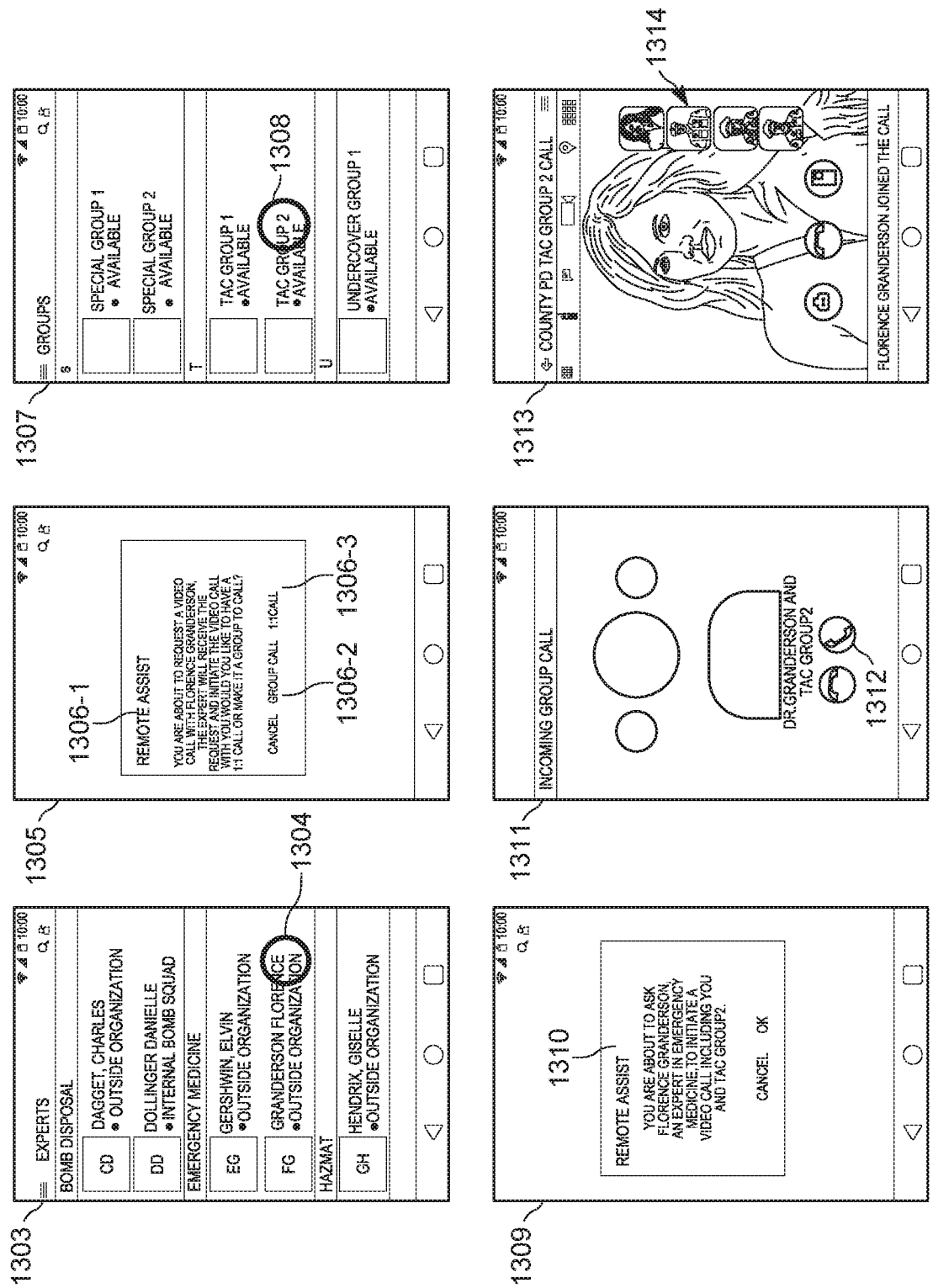
FIG. 13 depicts graphic user interfaces provided at the first device of FIG. 3 when an end-to-end call is being established with the second device of FIG. 4, that includes setting up a group call with other first devices, in accordance with some examples.
Figure 14:
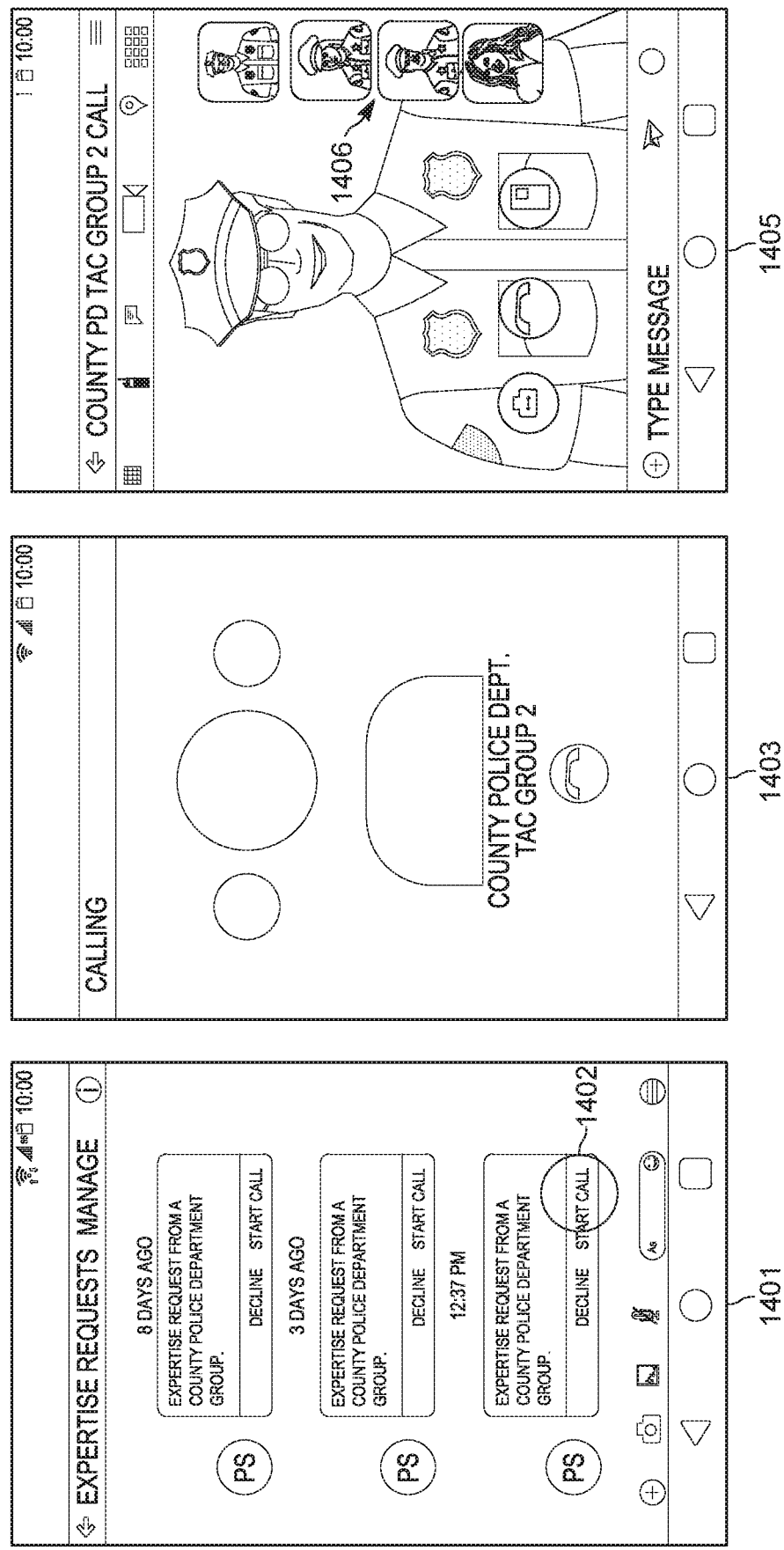
FIG. 14 depicts graphic user interfaces provided at the second device of FIG. 4 when an end-to-end call is being established with the first device of FIG. 3, that includes setting up a group call with other first devices, in accordance with some examples.

Attention is next directed to FIG. 13 and FIG. 14 which depict respective GUIs which may be provided at the respective display screens 305, 405 of the first device 101-1 and the second device 102 when setting up an end-to-end call therebetween, using the method 500; however, in these examples no group call has first been established between, but establishing the end-to-end call includes also establishing a group call with one or more of the other first devices 101. In particular FIG. 13 depicts GUIs at the display screen 305 of the first device 101-1, and FIG. 14 depicts GUIs at the display screen 405 of the second device 102. It is understood in each of the examples of FIG. 13 and FIG. 14 that the respective display screens 305, 405 each comprise respective touch-screens.

With attention directed to FIG. 13, the first device 101-1 may be operated by the responder 104-1 (e.g. via a menu system and the like), to provide a GUI 1303 showing entries in the directory 225 similar to the GUI 903. As depicted, the responder 104-1 may select an entry corresponding to the expert 199, as depicted, "Florence Granderson", for example by tapping on the entry, as represented by touch-screen input 1304.

In response, a GUI 1305 is provided which includes text 1306-1 indicating selection of the expert 199 and/or that a call and/or video call to the second device 102 of the expert 199 is being requested, as well as a selectable option to cancel (e.g. "Cancel"), a selectable option 1306-2 to establish a group call with the expert 199 and other first devices 101, and a selectable option 1306-3 to establish a one-on-one call with the expert 199. When the selectable option 1306-3 is selected, the end-to-end call is established as depicted in FIG. 9 and FIG. 10.

However, when the selectable option 1306-2 is selected, a GUI 1307 which provides a directory of preconfigured groups of the first devices 101, and touch-screen input 1308 may be used to select a preconfigured group, for example, as depicted "Tac Group 2".

In response, the server 103 begins to initiate the first call and the second call, and a GUI 1309 is provided (similar to the GUI 905) which includes text 1310 indicating selection of the expert 199 and/or that a call and/or video call to the second device 102 of the expert 199 is being requested, as well as selectable options to cancel (e.g. "Cancel") or connect (e.g. "OK") with the expert 199. Assuming that the connect (e.g. "OK") option has been selected, the server 103 begins to initiate the first call and the second call as described above, however the first call includes a group call to a plurality of the first devices 101 as defined by the selected preconfigured group, and which includes the first device 101-1. An optional GUI 907 may be provided that includes a selectable option 908 to "Cancel" the call to the expert 199, for example within a given period of time, such as 5 to 10 seconds and/or any other suitable given time period.

When the call to the expert 199 is not cancelled, the server 103 begins to initiate the first call and the second call by transmitting the URL (e.g. as described above with respect to the transmit 710 of the URL to the second device 102 in FIG. 7) to the second device 102 and the expert 199 may cause the first call and the second call to initiate by activating a selectable option mapped to the URL provided by the second device 102 (e.g. see the GUI 1401 described below). It is understood that when the expert 199 initiates the first call and the second call, the WebRTC peer connection 722 (e.g. the second call) is established between the second device 102 and the WebRTC call server 602, and the MC video server 105 begins to establish the 3GPP MC video session 725 (e.g. the first call) with the plurality of first devices 101 of the selected preconfigured group and the first device 101-1. Hence, the first device 101-1 (and the plurality of first devices 101 of the selected preconfigured group) may receive a call request (e.g. to establish a new group call), for example as represented by a GUI 1311 which has a format of an incoming call from the expert (e.g. "Dr. Granderson") and the selected preconfigured group (e.g. "Tac Group 2").

A selectable option 1312 to accept the call may be selected via touch-screen input to complete establishment of the 3GPP MC video session 725 and the end-to-end call such that a GUI 1313 is provided at the first device 101-1 (and the plurality of first devices 101 of the selected preconfigured group) to conduct the one-on-one end-to-end call with the second device 102. As depicted, the GUI 1313 may include video of the expert 199, inset video 1314 of the responder 104-1 using the first device 101-1 and other responders 104 using the plurality of first devices 101 of the selected preconfigured group (e.g. who have answered the group call), as well as selectable options controlling the call, including, but not limited to, a selectable option for ending the call, and the like.

Similarly, with reference to FIG. 14, when the URL is received at the second device 102 (e.g. as described above with respect to the transmit 710 of the URL to the second device 102 in FIG. 7), for example in a text message and the like (e.g. as described above), a GUI 1401 may be provided with a selectable option to "Decline" a call from the first device 101-1 and a selectable option "START CALL" to start the group call with the first device 101-1 and the plurality of first devices 101 of the selected preconfigured group. A person of skill in the art understands that the selectable option "START CALL" may be mapped to the URL, such that when "START CALL" is selected via touch-screen input 1402, the web application 224 is retrieved and launched to "call" the first device 101-1 and the plurality of first devices 101 of the selected preconfigured group, as depicted in a GUI 1403. While not depicted, optional authentication may occur. When the end-to-end call is established, as described above, a GUI 1405 is provided, corresponding to the GUI 1111, to conduct the end-to-end call at the second device 102. In particular, while the GUI 1405 includes a name and the like associated with the responders in the group call (e.g. "Tac Group 2"), information identifying the first device 101-1 and/or other first devices 101 in the group call, such as telephone numbers, network addresses, and the like, is not provided. The GUI 1405 further includes video of the existing group call (e.g. similar to the GUI 1111) and inset video 1406 of the expert 199 and other responders 104 on the existing group call, as well as selectable options controlling the call, including, but not limited to, a selectable option for ending the call, and the like.

While particular scenarios and/or use cases are described with respect to FIG. 9, FIG. 10, FIG. 11, FIG. 12, FIG. 13, and FIG. 14, any suitable scenario and/or according to the method 500 is within the scope of the present specification.

Hence, provided herein is a device, system and method for communicating between devices using two protocols which may enable two devices to communicate using MCX clients and WebRTC applications such that a first device using the MCX client may establish communication with a second device without the second device installing the MCX client. Such communications may also occur without the first device revealing a telephone number, and the like, to the second device.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A server comprising:
    a communication unit; and
    a controller communicatively coupled to the communication unit, the controller configured to:
        receive, via the communication unit, from a first device, a first request to communicate with an expert associated with a second device, the first request comprising the first device accessing a directory of experts stored at a memory accessible by the controller to select the expert associated with the second device;
        allocate a dedicated client operating according to a first protocol;
        operate a call server according to a Web Real-Time Communication (WebRTC) protocol;
        generate and transmit, via the communication unit, to the second device, a network address of an WebRTC web application for conducting a call via the call server using the WebRTC protocol, the network address including an identifier associated with the first device and the second device;
        in response to transmitting the network address to the second device, receive, via the communication unit, from the second device, a second request, including the identifier, the second request to get the WebRTC web application via the network address;
        transmit, via the communication unit, to the second device, the WebRTC web application;
        set up a first call between the dedicated client and a respective dedicated client at the first device using the first protocol;
        set up a second call between the call server and the WebRTC web application at the second device using the WebRTC protocol; and
        connect the first call and the second call between the dedicated client and the call server, to conduct an end-to-end call between the first device and the second device.

2. The server of claim 1, wherein the first call comprises a group call that is further between the dedicated client and a plurality of first devices, including the first device, and the end-to-end call includes video data between the plurality of first devices and the second device.

3. The server of claim 1, wherein the first protocol comprises one or more of a Mission Critical (MC) protocol and a 3rd Generation Partnership Project (3GPP) protocol.

4. The server of claim 1, wherein the controller has access to the directory of experts that includes a respective network address of the second device, and the controller is further configured to:
    incorporate the identifier into the network address of the WebRTC web application stored in a respective memory accessible to the controller; and
    transmit the network address of the WebRTC web application to the second device by one or more of: transmitting, via the communication unit, the network address of the WebRTC web application to the second device, using the respective network address of the second device; and transmitting, via the communication unit, the network address of the WebRTC web application to the first device, the first device transmitting the network address of the WebRTC web application to the second device.

5. The server of claim 1, wherein the first call is conducted via a first protocol server operating according to the first protocol, such that the end-to-end call includes:
    a first portion between the first device and the first protocol server;
    a second portion between the first protocol server and the dedicated client;
    a third portion between the dedicated client and the call server; and
    a fourth portion between the call server and the second device.

6. The server of claim 1, wherein the dedicated client comprises a temporary dedicated client assigned a temporary network address for use in the first call, the temporary network address selected from a pool of temporary network addresses, the controller further configured to:
    freeze the temporary network address at the pool at least during the end-to-end call; and
    unfreeze the temporary network address at the pool after one or more of: the end-to-end call ends; and a given time period.

7. The server of claim 1, wherein the identifier is valid for a given time period, and the controller is further configured to, when the end-to-end call ends during the given time period:
    when a third request, including the identifier, is received for the WebRTC web application from the second device during the given time period:
        set up a third call between the dedicated client and the respective dedicated client at the first device using the first protocol;
        set up a fourth call between the call server and the WebRTC web application at the second device using the WebRTC protocol; and
        connect the third call and the fourth call between the dedicated client and the call server, to conduct a second end-to-end call between the first device and the second device; and when the third request is received after the given time period:
  decline to set up the second end-to-end call.

8. The server of claim 1, wherein the identifier is valid for a given number of uses.

9. The server of claim 1, wherein the controller is further configured to one or more of:
  set up the first call after the second call is set up;
  set up the first call while the second call is being set up; and
  set up the first call before the second call is set up.

10. The server of claim 1, wherein the controller is further configured to connect the first call and the second call by: translating respective packets of each of the first call and the second call between the first protocol and the WebRTC protocol.

11. A method comprising:
  receiving, at a controller, via a communication unit, from a first device, a first request to communicate with an expert associated with a second device, the first request comprising the first device accessing a directory of experts stored at a memory accessible by the controller to select the expert associated with the second device;
  allocating, using the controller, a dedicated client operating according to a first protocol;
  operating, using the controller, a call server according to a Web Real-Time Communication (WebRTC) protocol;
  generating, using the controller, and transmitting, via the communication unit, to the second device, a network address of a WebRTC web application for conducting a call via the call server using the WebRTC protocol, the network address including an identifier associated with the first device and the second device;
  in response to transmitting the network address to the second device, receiving, at the controller, via the communication unit, from the second device, a second request, including the identifier, the second request to get the WebRTC web application via the network address;
  transmitting, using the controller, via the communication unit, to the second device, the WebRTC web application;
  setting up, using the controller, a first call between the dedicated client and a respective dedicated client at the first device using the first protocol;
  setting up, using the controller, a second call between the call server and the WebRTC web application at the second device using the WebRTC protocol; and
  connecting, using the controller, the first call and the second call between the dedicated client and the call server, to conduct an end-to-end call between the first device and the second device.

12. The method of claim 11, wherein the first call comprises a group call that is further between the dedicated client and a plurality of first devices, including the first device, and the end-to-end call includes video data between the plurality of first devices and the second device.

13. The method of claim 11, wherein the first protocol comprises one or more of a Mission Critical (MC) protocol and a 3rd Generation Partnership Project (3GPP) protocol.

14. The method of claim 11, wherein the controller has access to the directory of experts that includes a respective network address of the second device, and the method further comprises:
  incorporating, using the controller, the identifier into the network address of the WebRTC web application stored in a respective memory accessible to the controller; and
  transmitting, using the controller, the network address of the WebRTC web application to the second device by one or more of: transmitting, via the communication unit, the respective network address of the WebRTC web application to the second device, using the respective network address of the second device; and transmitting, via the communication unit, the network address of the WebRTC web application to the first device, the first device transmitting the network address of the WebRTC web application to the second device.

15. The method of claim 11, wherein the first call is conducted via a first protocol server operating according to the first protocol, such that the end-to-end call includes:
  a first portion between the first device and the first protocol server;
  a second portion between the first protocol server and the dedicated client;
  a third portion between the dedicated client and the call server; and
  a fourth portion between the call server and the second device.

16. The method of claim 11, wherein the dedicated client comprises a temporary dedicated client assigned a temporary network address for use in the first call, the temporary network address selected from a pool of temporary network addresses, the method further comprising:
  freezing, using the controller, the temporary network address at the pool at least during the end-to-end call; and
  unfreezing, using the controller, the temporary network address at the pool after one or more of: the end-to-end call ends; and a given time period.

17. The method of claim 11, wherein the identifier is valid for a given time period, and the method further comprises, when the end-to-end call ends during the given time period:
  when a third request, including the identifier, is received for the WebRTC web application from the second device during the given time period:
    setting up, using the controller, a third call between the dedicated client and the respective dedicated client at the first device using the first protocol;
    setting up, using the controller, a fourth call between the call server and the WebRTC web application at the second device using the WebRTC protocol; and
    connecting, using the controller, the third call and the fourth call between the dedicated client and the call server, to conduct a second end-to-end call between the first device and the second device; and
  when the third request is received after the given time period:
    declining, using the controller, to set up the second end-to-end call.

18. The method of claim 11, wherein the identifier is valid for a given number of uses.

19. The method of claim 11, further comprising one or more of:
  setting up, using the controller, the first call after the second call is set up;
  setting up, using the controller, the first call while the second call is being set up; and
  setting up, using the controller, the first call before the second call is set up.

20. The method of claim 11, further comprising connecting, using the controller, the first call and the second call by: translating respective packets of each of the first call and the second call between the first protocol and the WebRTC protocol.

* * * * *